(12) United States Patent
Akada

(10) Patent No.: US 9,476,900 B2
(45) Date of Patent: Oct. 25, 2016

(54) MEASURING SUBSTRATE, SUBSTRATE TREATMENT APPARATUS AND SUBSTRATE TREATMENT APPARATUS OPERATION METHOD

(71) Applicant: Tokyo Electron Limited, Tokyo (JP)

(72) Inventor: Hiraku Akada, Kushi (JP)

(73) Assignee: Tokyo Electron Limited, Tokyo (JP)

( * ) Notice: Subject to any disclaimer, the term of this patent is extended or adjusted under 35 U.S.C. 154(b) by 621 days.

(21) Appl. No.: 13/925,919

(22) Filed: Jun. 25, 2013

(65) Prior Publication Data

US 2014/0007669 A1 Jan. 9, 2014

(30) Foreign Application Priority Data

Jul. 6, 2012 (JP) ................................. 2012-152717

(51) Int. Cl.
| | | |
|---|---|---|
| *G01F 1/00* | (2006.01) | |
| *G01P 13/00* | (2006.01) | |
| *G01F 1/684* | (2006.01) | |
| *G01F 1/692* | (2006.01) | |

(52) U.S. Cl.
CPC ............. *G01P 13/0006* (2013.01); *G01F 1/00* (2013.01); *G01F 1/6845* (2013.01); *G01F 1/692* (2013.01); *Y10T 29/5313* (2015.01)

(58) Field of Classification Search
CPC ........ G01F 1/692; G01F 1/6845; G01F 1/00; H01L 21/67; H01L 21/027
USPC .................. 29/729; 73/170.01, 204.11, 754; 324/537; 257/48; 438/14; 702/81, 182
See application file for complete search history.

(56) References Cited

U.S. PATENT DOCUMENTS

| | | | | |
|---|---|---|---|---|
| 6,064,640 A | * | 5/2000 | Shinoda | G11B 23/0316 720/656 |
| 2007/0272827 A1 | * | 11/2007 | Heo | H01L 27/14618 250/208.1 |
| 2010/0139389 A1 | * | 6/2010 | Morita | G01F 5/00 73/204.11 |
| 2011/0040527 A1 | * | 2/2011 | Renken | H01L 22/34 702/182 |
| 2012/0189406 A1 | * | 7/2012 | Duhamel | H01L 21/67276 414/217 |
| 2013/0080099 A1 | * | 3/2013 | Akada | H01L 21/67253 702/81 |
| 2013/0141913 A1 | * | 6/2013 | Sachsenweger | F21V 29/004 362/249.02 |

FOREIGN PATENT DOCUMENTS

| | | | |
|---|---|---|---|
| JP | 2006-080489 A | 3/2006 | |
| JP | 2008-109027 A | 5/2008 | |
| JP | WO 2011152396 A1 * | 12/2011 | ........ H01L 21/67253 |

* cited by examiner

*Primary Examiner* — Laura Martin
*Assistant Examiner* — Suman K Nath
(74) *Attorney, Agent, or Firm* — Posz Law Group, PLC

(57) ABSTRACT

The present invention includes a first substrate having a sensor part for measuring a measured factor and a second substrate that is to be detachably stacked on a lower side of the first substrate, the second substrate including: a signal processing part that processes a measurement signal obtained by measurement by the sensor part; a power supply part for feeding power to the sensor part; and at least either a memory that stores measurement data obtained by being processed in the signal processing part or a communication part for transmitting the measurement data by wireless, wherein the second substrate is in common use for a plurality of kinds of first substrates different in measured factor measured by the sensor part from each other.

13 Claims, 35 Drawing Sheets

FIG.27

| | | RESIST COATING MODULE | | | ANTI-REFLECTION FILM FORMING MODULE | | | |
|---|---|---|---|---|---|---|---|---|
| | | FIRST TIME MEASUREMENT | SECOND TIME MEASUREMENT | THIRD TIME MEASUREMENT | FIRST TIME MEASUREMENT | SECOND TIME MEASUREMENT | THIRD TIME MEASUREMENT | ... |
| ACCELERATION | X1 | | | | | | | |
| | Y1 | | | | | | | |
| ECCENTRIC DISTANCE | | | | | | | | |
| ROTATION CENTER COORDINATES | | X--- Y--- | | | X--- Y--- | | | |

74B

| | RESIST COATING MODULE | | | | ANTI-REFLECTION FILM FORMING MODULE | | | |
|---|---|---|---|---|---|---|---|---|
| MEASUREMENT TIME | t1 | t2 | t3 | ... | t1 | t2 | t3 | ... |
| ACCELERATION | X1 | | | | | | | |
| | Y1 | | | | | | | |
| DELIVERY POSITION COORDINATES | Z--- | | | | Z--- | | | |

74C

| | HEATING MODULE | |
|---|---|---|
| | DETECTED TEMPERATURE | |
| OUTPUT VALUE | t1 t2 t3 | ... |
| Ch1 | | |
| Ch2 | | |
| ... | | |

74D

MEASURING SUBSTRATE, SUBSTRATE TREATMENT APPARATUS AND SUBSTRATE TREATMENT APPARATUS OPERATION METHOD

BACKGROUND OF THE INVENTION

1. Field of the Invention

The present invention relates to a technical field of a measuring substrate for performing measurement in a substrate treatment apparatus that performs treatment on a treatment target substrate.

This application is based upon and claims the benefit of priority of the prior Japanese Patent Application No. 2012-152717, filed in Japan on Jul. 6, 2012, the entire contents of which are incorporated herein by reference.

2. Description of the Related Art

In a semiconductor manufacturing process, a substrate is sequentially carried into a plurality of treatment modules and subjected to a series of treatments. The treatment modules include, for example, a coating module that applies a treatment solution to the substrate by spin coating, a heating module that heat-treatments a coating film formed on the substrate and so on. In a more specific example, the treatment modules include a module that applies a resist solution, a module that heats the resist film, a module that heats the resist film after exposure, a module that supplies a developing solution to the resist film and so on. Similar modules are used in a treatment of forming an insulating film with a treatment solution on the substrate.

To treat a semiconductor wafer (hereinafter, referred to as a wafer) being a treatment target substrate in the treatment modules, factors affecting the treatments in the treatment modules need to be adjusted in advance. For example, down flow is formed to prevent mist spun off from the wafer during the spin coating from reattaching to the wafer in the coating module, and purge gas is supplied to a treatment atmosphere to prevent sublimate generated from the coating film from reattaching to the substrate in the heating module. Turbulence in state (wind direction, wind speed) of gas flow in the treatment modules changes the temperature within the wafer to cause a decrease in in-plane uniformity of the treatment, and difference in state of gas flow among the same kind of treatment modules causes variations in treatment among wafers.

For this reason, the states of gas flows in the treatment modules are investigated by computer simulation and adjustment work is performed based on the results, but it is required to further highly accurately grasp the states of the gas flows. Furthermore, it is important to grasp the states of gas flows not only in the treatment modules but also in a carry path for the substrate because they affect particle contamination to the substrate being carried.

In response to the requirement, development of a gas flow sensor is under discussion, and it is advantageous to configure the measuring substrate as cordless (wireless) in order to improve the operation efficiency. However, the wireless substrate increases in cost as compared with a wired-type substrate because a signal processing circuit including a power feeding circuit (power supply part), an analog circuit, and a control circuit, and a communication circuit or a memory as well as the sensor part need to be mounted on a wiring substrate.

On the other hand, prior to treatment performed on a product wafer, it is also required to grasp in advance a temperature distribution of a heating plate in the heating module and a delivery position when the product wafer is delivered to a mounting part in the treatment module, in addition to the states of gas flows. It is disclosed, in Japanese Laid-open Patent Publication No. 2006-80489, that the wireless wafer including a temperature sensor is used to measure the temperature in the heating module and store it in a memory, and the wafer is returned to a dedicated carrier to read measurement data from the memory. It is also disclosed, in Japanese Laid-open Patent Publication No. 2008-109027, that a wireless wafer including an acceleration sensor is delivered by a substrate carrier mechanism to a spin chuck in the coating module, and a positional displacement amount between a rotation center and a center of the wafer is grasped based on a measurement signal of the acceleration sensor when rotating the wafer. By using the measuring substrate as a wireless substrate as described above, the measurement operation can be performed with higher operation efficiency. However, the wireless substrate is expensive as has been described, and there are many kinds of measurement targets (measured factors), contributing to increase in total operation cost.

SUMMARY OF THE INVENTION

The present invention has been made under such circumstances, and it is an object to provide a technique capable of reducing the cost required for measurement when measuring a factor affecting a treatment state of a treatment target substrate or a factor relating to a carry operation for the substrate in a substrate treatment apparatus.

A measuring substrate of the present invention is a measuring substrate used for a substrate treatment apparatus in which a treatment target substrate is carried by a substrate carrier mechanism into a treatment module and treated, and for performing measurement of a factor affecting a treatment state of the treatment target substrate or a factor relating to a carry operation for the substrate, the measuring substrate including:

a first substrate having a sensor part for measuring at least either of the factors; and a second substrate that is to be detachably stacked on a lower side of the first substrate. In addition, the second substrate includes:

a signal processing part that processes a measurement signal obtained by measurement by the sensor part;

a power supply part for feeding power to the sensor part; and at least either a memory that stores measurement data obtained by being processed in the signal processing part or a communication part for transmitting the measurement data by wireless, and the second substrate is in common use for a plurality of kinds of first substrates different in measured factor measured by the sensor part from each other.

The present invention according to another aspect is a substrate treatment apparatus in which a treatment target substrate is carried by a substrate carrier mechanism into a treatment module and treated, the substrate treatment apparatus including:

a storage part that stores a plurality of kinds of first substrates that have sensor parts for measuring a factor affecting a treatment state of the treatment target substrate or a factor relating to a carry operation for the substrate and are different in measured factor measured by the sensor part from each other, and a second substrate that is to be detachably stacked on a lower side of the first substrate and in common use for the plurality of kinds of first substrates; and an attaching/detaching mechanism for attaching/detaching the first substrate to/from the second substrate, the second substrate including: a signal processing part that processes a measurement signal obtained by measurement by the sensor part; a power supply part for feeding power to the sensor part; and at least either a memory that stores measurement data obtained by being processed in the signal processing part or a communication part for transmitting the measurement data by wireless, wherein a measuring substrate formed by attaching the second substrate to the first substrate by the attaching/detaching mechanism is delivered to the substrate carrier mechanism.

The present invention according to still another aspect is a substrate treatment apparatus operation method of performing measurement using a measuring substrate before performing substrate treatment, for a substrate treatment apparatus in which a treatment target substrate is carried by a substrate carrier mechanism into a treatment module and treated, the method including the steps of:

forming a measuring substrate by stacking a second substrate on a lower side of a first substrate, the first substrate having a sensor part for measuring a factor affecting a treatment state of the treatment target substrate or a factor relating to a carry operation for the substrate, and the second substrate including: a signal processing part that processes a measurement signal obtained by measurement by the sensor part; a power supply part for feeding power to the sensor part; and at least either a memory that stores measurement data obtained by being processed in the signal processing part or a communication part for transmitting the measurement data by wireless;

delivering the measuring substrate to the substrate carrier mechanism and performing measurement;

then detaching the first substrate from the second substrate, and attaching another kind of first substrate having a sensor part for measuring a measured factor different from a measured factor measured by the sensor part of the detached first substrate, to the second substrate to form a measuring substrate; and then delivering the formed measuring substrate to the substrate carrier mechanism and performing measurement.

According to the present invention, the cost can be reduced as compared to the case of configuring a wireless measuring substrate for each kind.

Further, according to the present invention in another aspect, a first substrate and a second substrate are stored in a storage part so that a first substrate of one kind in a measuring substrate is exchanged by an attaching/detaching mechanism with respect to a second substrate of another kind, resulting in excellent operation efficiency.

BRIEF DESCRIPTION OF THE DRAWINGS

FIG. 27 is a schematic chart of the memory in FIG. 26;

Figure 1:
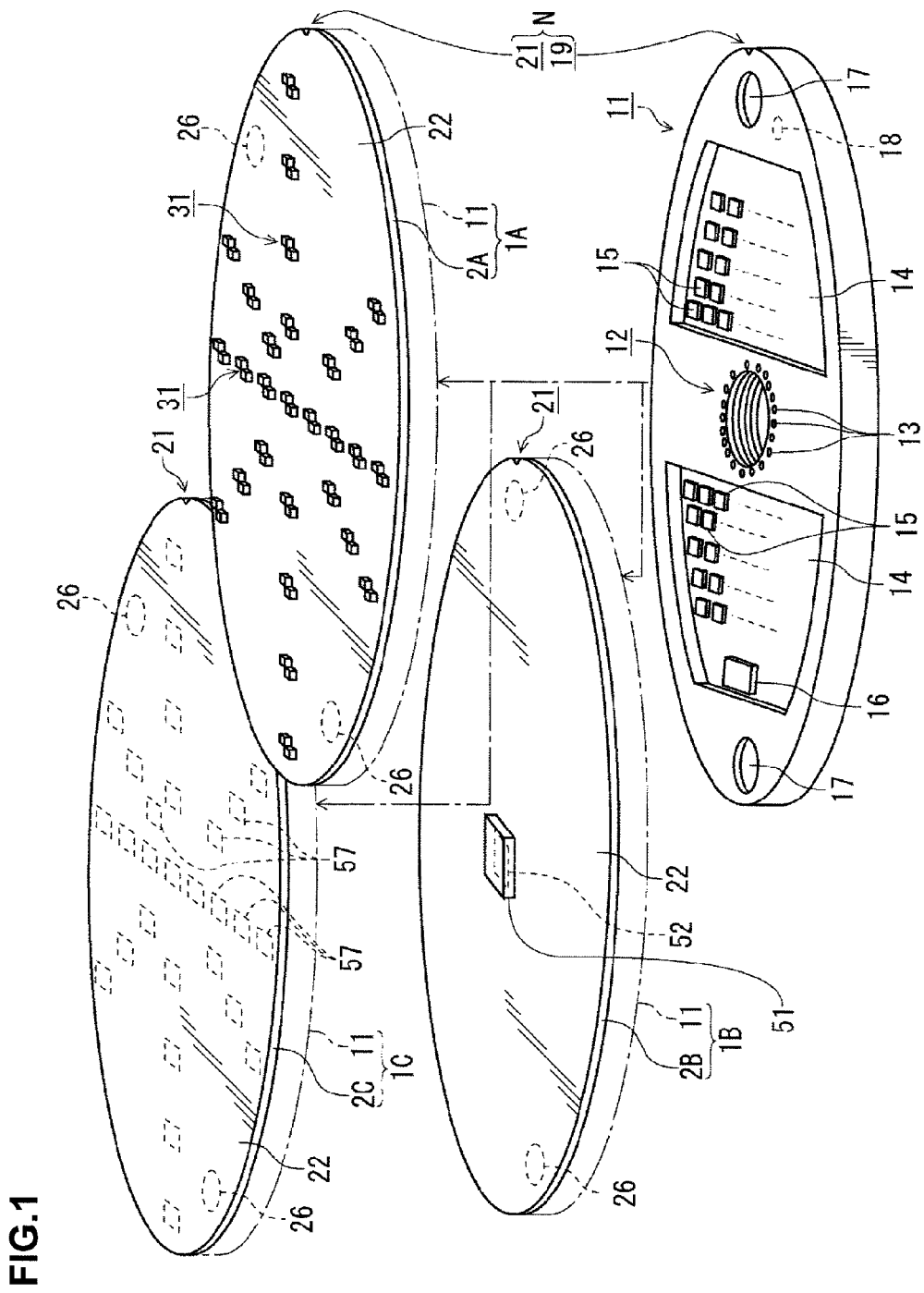
FIG. 1 is a perspective view of measuring wafers according to an embodiment of the present invention.

DETAILED DESCRIPTION OF THE INVENTION (First Embodiment)

Measuring wafers 1A, 1B, 1C in a first embodiment of the present invention will be described referring to FIG. 1 being a perspective view thereof and FIG. 2 being a schematic circuit diagram thereof. The measuring wafers 1A to 1C are carried in a coating and developing apparatus 6 that is a substrate treatment apparatus, similarly to a wafer W to be treated by the coating and developing apparatus 6 (see FIG. 18). More specifically, many modules on which the wafer W is to be mounted are provided in the coating and developing apparatus 6, and the wafer W is carried among the modules by a carrier mechanism, and the measuring wafers 1A to 1C are carried among the modules. The measuring wafers 1A to 1C transmit various kinds of measurement data by wireless to a control unit 7 provided in the coating and developing apparatus 6 (see FIG. 25).

The measuring wafer 1A has a role to detect the wind direction and the wind speed of gas flow on the surface of the wafer W mounted on a mounting part of each of the modules. The measuring wafer 1B has a role to detect the position of a spin chuck of a module that forms a film on the wafer W by spin coating. More specifically, the spin chuck rotates while holding the rear surface of the wafer W so that the spin coating is performed by supplying a treatment solution from a treatment solution nozzle to the rotated wafer W, and the rotation center position of the spin chuck is detected. Note that if the wafer W is mounted on the spin chuck with the center of the wafer W displaced from the rotation center position when supplying a solvent to an edge portion of the rotated wafer W to remove a film after the spin coating, the width of the film to be removed varies in a circumferential direction of the wafer W. To prevent the variation, the rotation center is detected as described above. Further, for appropriate carriage of the wafer W, the measuring wafer 1B also has a role to detect a height position for delivery between the module and a carrier mechanism for the wafer W.

The measuring wafer 1C has a role to measure a temperature distribution of the wafer W mounted on a hot plate of a heating module. The gas flow, the rotation center and the temperature measured by using the measuring wafers 1A to 1C are factors affecting treatments of the wafer W, and the delivery height position measured by the measuring wafer 1B is a factor relating to the operation of carrying the wafer W.

The measuring wafers 1A to 1C are formed in a circular shape substantially the same as that of the wafer W except that they are slightly larger in thickness than the wafer W. The measuring wafers 1A to 1C are each composed of respective unique upper wafers 2A to 2C and a lower wafer 11 that is in common use in the measuring wafers 1A to 1C and stacked on the lower side of the upper wafers 2A to 2C. The upper wafer 2A to 2C and the lower wafer 11 are configured to be attachable/detachable to/from each other. In other words, by attaching the upper wafer 2A to 2C to the lower wafer 11 in a replacement manner depending on the kind of measurement, a measuring wafer for gas flow measurement, for position detection, or for temperature distribution measurement can be obtained. The upper wafers 2A to 2C include sensors for the above measurements respectively. The lower wafer 11 has a role to supply electric power to the sensors and transmit detection data transmitted from the sensors, to the control unit 7 by wireless.

Explaining the lower wafer 11, the lower wafer 11 is formed in a circular shape and has a recess 12 for coupling with the upper wafer 2A to 2C. The recess 12 is formed in a circular shape that is reduced in diameter downward, and has a side surface threaded. Along an open edge of the recess 12, many electrodes 13 are arranged at intervals in an annular shape. Each of the upper wafers 2A to 2C is attached to the lower wafer 11, the sensors of the upper wafer 2A to 2C are connected to the electrodes 13 different from one another. In other words, different electrodes 13 are used for each upper wafer to be used, and a different electrode 13 is used for each sensor on one upper wafer. In FIG. 2, an electrode for transmitting the output signal from the sensor to the lower wafer 11 and an electrode for electric power supply to the sensor are collectively indicated as one electrode 13. Note that as for a later-described electrode 24 corresponding to the electrode 13, a plurality of electrodes are also indicated as one electrode similarly to the above. Further, for convenience of illustration, the number of the electrodes 13 is smaller than the actual number in FIG. 1 and so on.

Outside the electrodes 13, component storing recesses 14, 14 are formed in right and left directions in a plan view. In these component storing recesses 14, many circuit components 15 and a power supply part 16 are provided. For the circuit components 15, only part thereof are illustrated in FIG. 1 for preventing complication of the drawing. The heights of the circuit components 15 and the power supply part 16 are smaller than the depth of the component storing recesses 14 so that the surface of the lower wafer 11 can be brought into close contact with the rear surface of the upper wafer 2A to 2C. Outside the component storing recesses 14, 14, circular engaging recesses 17, 17 are provided.

On the rear surface of the lower wafer 11, an electrode 18 is formed that is connected to the power supply part 16 to charge a rechargeable battery constituting the power supply part 16. Further, a notch 19 is provided at an edge portion of the lower wafer 11. When the upper wafer 2A to 2C is attached to the lower wafer 11, the notch 19 is superposed on a notch 21 provided at an edge portion of each of the upper wafers 2A to 2C to form a notch N for specifying the orientation of the measuring wafer 1A to 1C. The lower wafer 11 will be described later in more detail.

Figure 3:
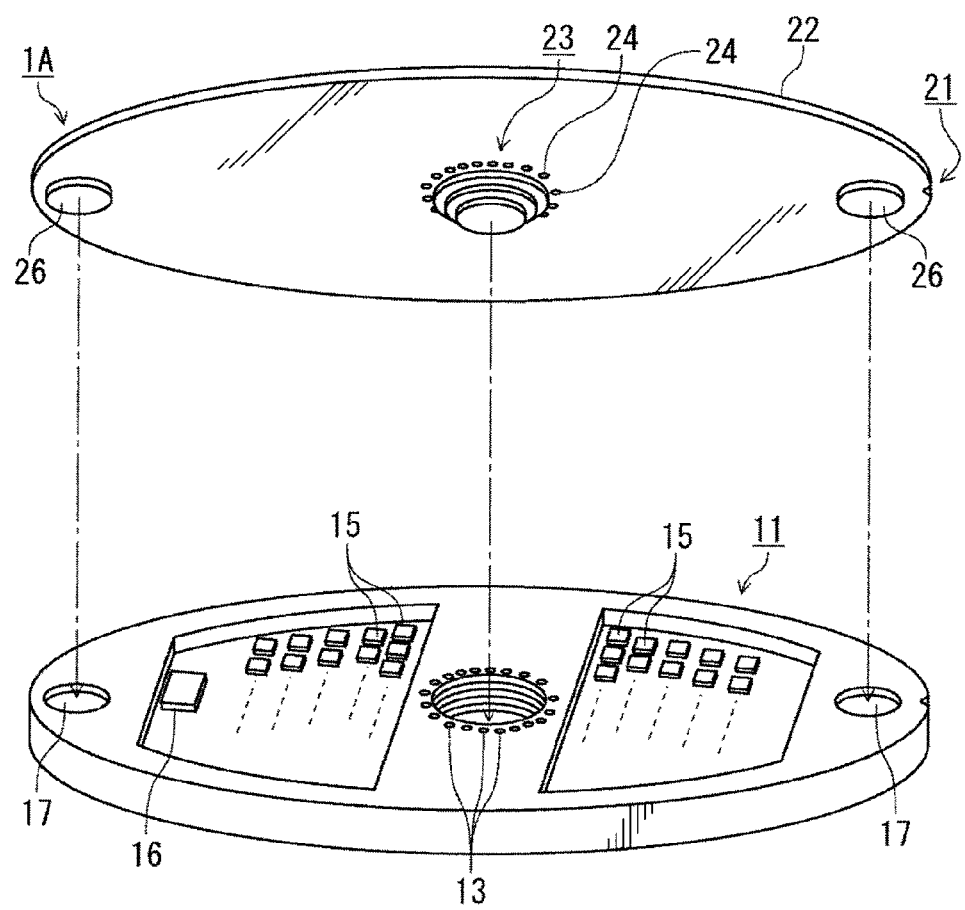
FIG. 3 is an exploded perspective view of a wafer for gas flow measurement.
Figure 4:
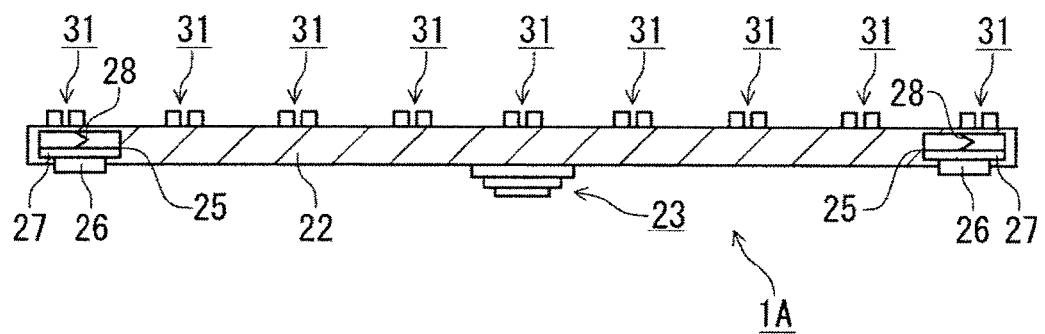
FIG. 4 is a longitudinal sectional view of an upper wafer for gas flow measurement.

The upper wafer 2A will be described referring to FIG. 3 being a rear surface perspective view thereof and FIG. 4 being a longitudinal sectional view thereof as well. The upper wafer 2A includes a circular substrate main body 22 to be superposed on the lower wafer 11 and has a circular projection 23 formed at the middle on the rear surface of the substrate main body 22. The projection 23 is reduced in diameter downward so as to be inserted into the recess 12 of the lower wafer 11, and has a circumferential surface threaded to be screwed with the recess 12. As is apparent from the discussion and the figures, the projection 23 and the recess 12 are "threaded portions." Around the projection 23, the electrodes 24 connected to later-described wind speed sensors 3A, 3B provided at the upper wafer 2A. The electrodes 24 have roles to supply electric power to the wind speed sensors 3A, 3B and output data acquired by the wind sensors 3A, 3B to the lower wafer 11, and are connected to predetermined electrodes 13 when the upper wafer 2A is attached to the lower wafer 11.

Figure 5:
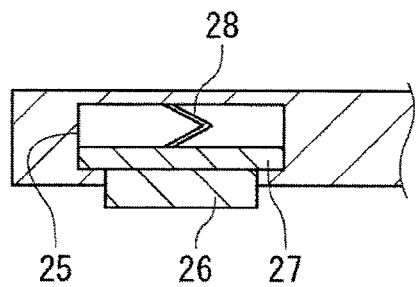
FIG. 5 is a longitudinal sectional view of an edge portion of the upper wafer in FIG. 4.
Figure 6:
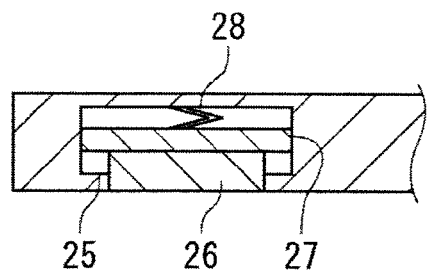
FIG. 6 is a longitudinal sectional view of the edge portion of the upper wafer in FIG. 4.

At a peripheral portion of the rear surface of the substrate main body 22, opening portions 25, 25 opened from the inside of the substrate main body 22 to the lower side are formed in a manner to sandwich the projection 23 therebetween. The upper side of the opening portion 25 is enlarged in diameter. In the opening portions 25, column-shaped stoppers 26 being engaging projections are provided. An upper portion of the stopper 26 forms a flange 27 and is locked to the enlarged-diameter portion on the upper side of the opening portion 25 so as to prevent the stopper 25 from falling off Between the upper side of the flange 27 and a ceiling facing the flange 27, a spring 28 is provided. By the spring 28, the stopper 26 projects from the lower surface of the upper wafer 2A as illustrated in FIG. 5. The flange 27 is made of metal and rises by the magnetic force received from the upper side of the upper wafer 2A against the restoring force of the spring 28. This draws the stopper 26 into the upper wafer 2A as illustrated in FIG. 6. The spring 28 is made of a material immune to the magnetic force. The stoppers 26 engage with the engaging recesses 17 of the lower wafer 11 to suppress positional displacement in the circumferential direction between the upper wafer 2A and the lower wafer 11. The other upper wafers 2B, 2C have the above-described configuration of the upper wafer 2A. More specifically, each of the upper wafers 2B, 2C has a substrate main body 22, a projection 23, and stoppers 26 and is attached to the lower wafer 11 as with the upper wafer 2A.

Figure 7:
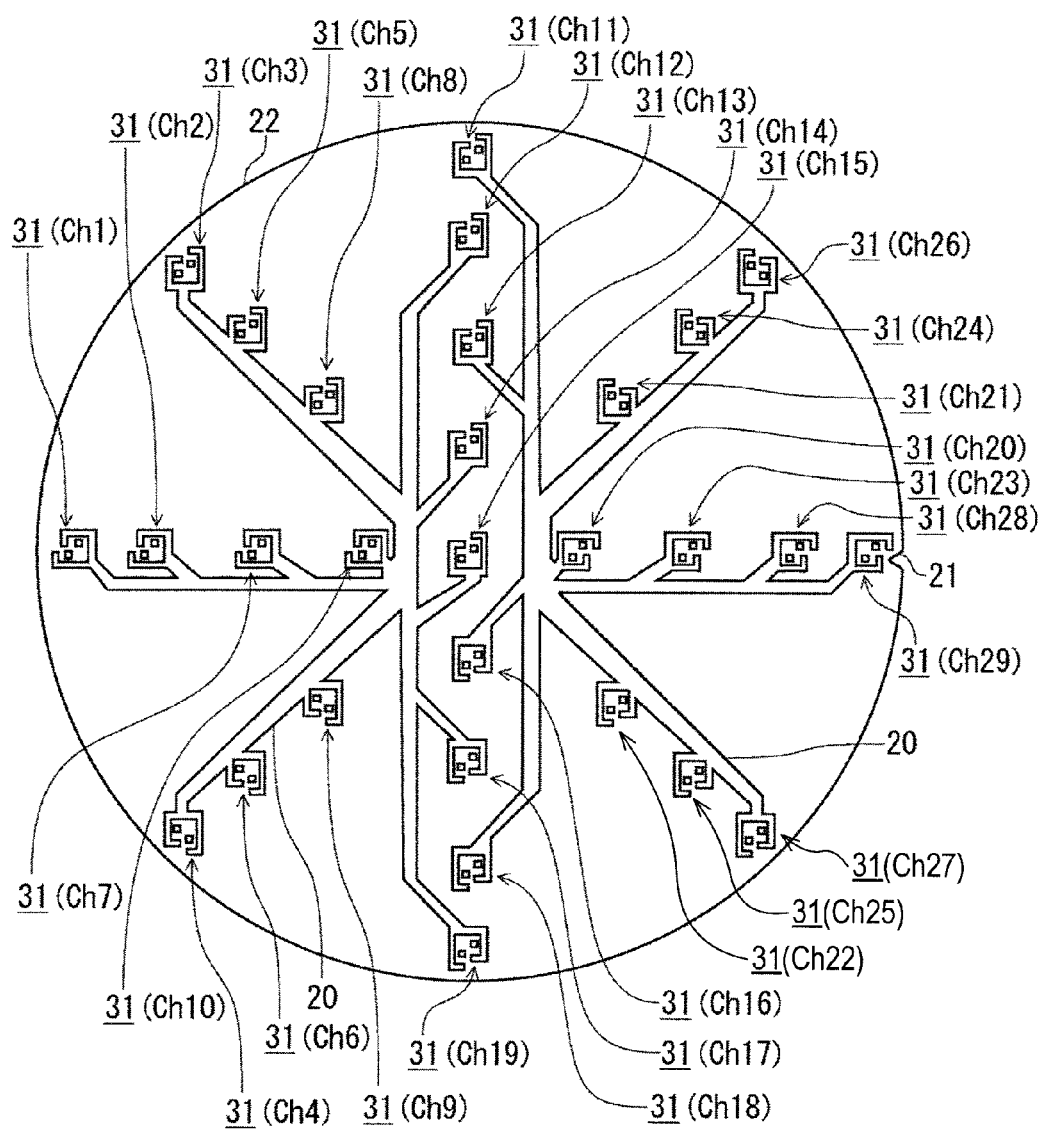
FIG. 7 is a plan view of the upper wafer constituting the wafer for gas flow measurement.

Subsequently, the unique configuration of the upper wafer 2A will be described. FIG. 7 illustrates the front surface of the upper wafer 2A in which sensor pairs 31 are arranged in a manner to radially spread in eight directions from the central portion to the peripheral portion. In the drawing, a numeral 20 denotes a wiring pattern formed on the front surface of the substrate main body 22, which is electrically connected to the electrodes 24 on the rear surface side. The wiring pattern 20 is actually composed of a plurality of lines, but a plurality of lines in parallel are illustrated as one line for convenience.

Figure 8:
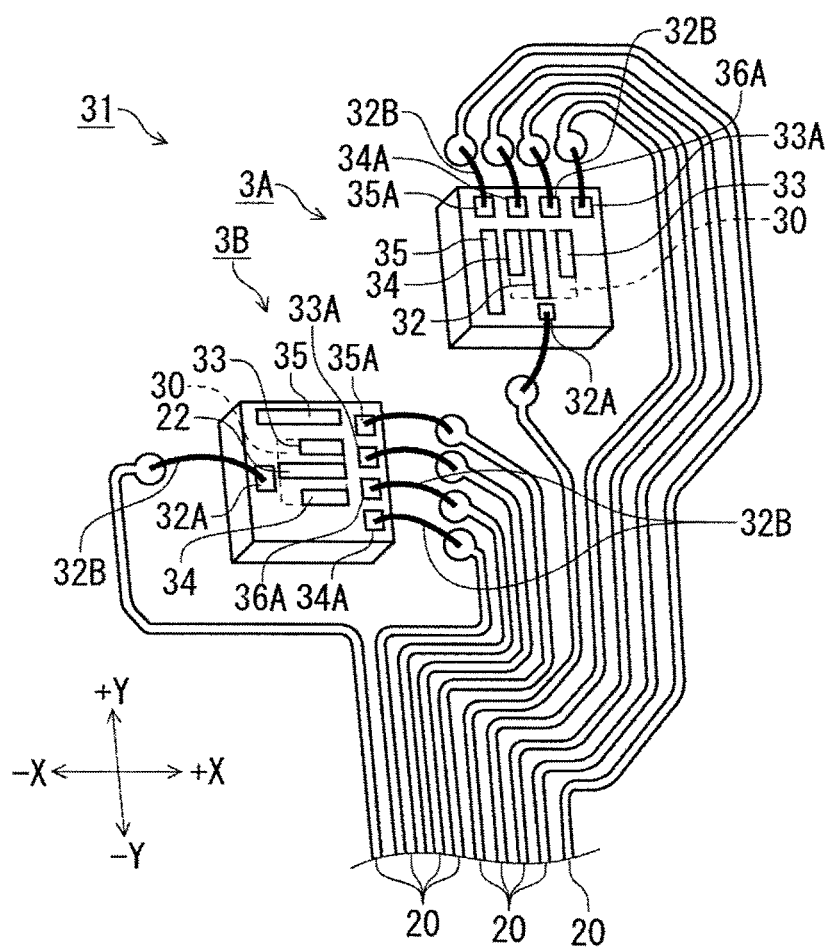
FIG. 8 is a perspective view of a sensor pair constituting the wafer for gas flow measurement.

Twenty nine sensor pairs 31 are provided in total and indicated as channels (Ch) 1 to 29 in the drawing. The sensor pairs 31 of the channels are configured similarly to one another. The sensor pair 31 of Ch 15 at the central portion of the measuring wafer 1A will be described as a representative referring to FIG. 8. The sensor pair 31 is composed of the wind speed sensors 3A, 3B which are arranged close to each other, and the wind speed sensors 3A, 3B output signals according to the wind speed of gas flow in predetermined straight directions on the front surfaces thereof. The wind speed sensors 3A, 3B are configured similarly to each other except that directions in which they can detect the wind speed are different.

The wind speed sensor 3A, taken as an example, will be described referring also to the longitudinal sectional views in FIG. 9, FIG. 10. The wind speed sensor 3A is a chip that is square in a plan view, a void part 29 is formed at the middle portion of the chip, and an insulating thin film 30 is formed to cover the front surface of the void part 29. On the insulating thin film 30, a heater 32 is formed, and thermopiles 33, 34 are formed in a manner to sandwich the heater 32 therebetween. Further, a temperature sensor 35 being a resistance temperature sensor is provided with the chip, and the resistance value of the temperature sensor 35 changes according to the ambient temperature.

Figure 11:
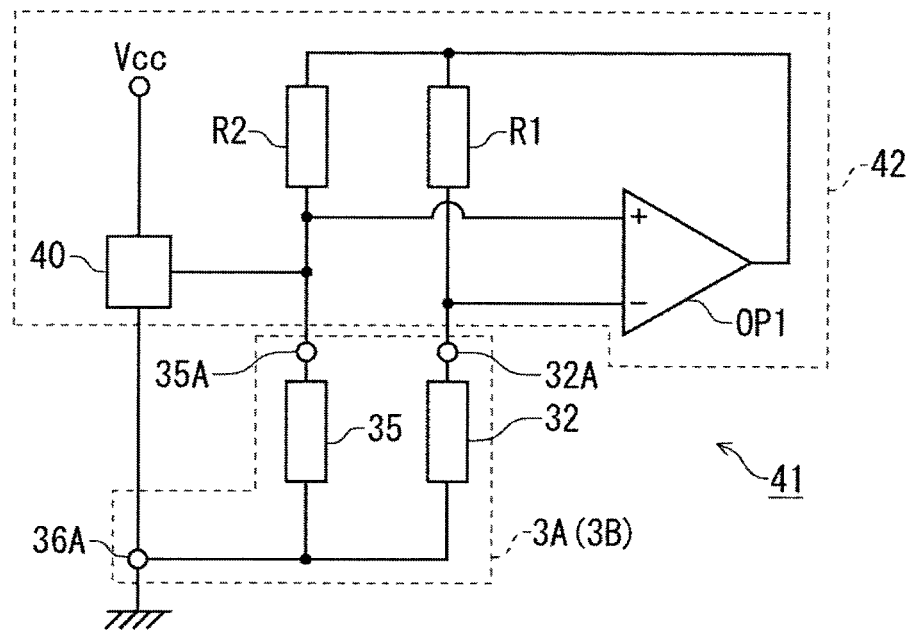
FIG. 11 is a circuit diagram composed of the upper wafer and a lower wafer constituting the measuring wafer.

The heater 32, the temperature sensor 35, and the above-described circuit component 15 provided on the lower wafer 11 constitute a temperature compensation circuit 41 illustrated in FIG. 11. Explaining the temperature compensation circuit 41, the heater 32 and the temperature sensor 35 are connected in series to fixed resistors R1, R2 respectively. The midpoint between the heater 32 and the fixed resistor R1 and the midpoint between the temperature sensor 35 and the fixed resistor R2 are connected to an inverting input terminal and a non-inverting input terminal of an operational amplifier OP1 respectively. An output terminal of the operational amplifier OP1 is connected to the fixed resistors R1, R2.

The heater 32 and the temperature sensor 35 are connected to the ground, so that the heater 32, the temperature sensor 35, and the fixed resistors R1, R2 constitute a bridge circuit. Further, a current supply circuit 40 is provided between an electrode that applies a power supply voltage Vcc and the ground. The current supply circuit 40 is connected between the fixed resistor R2 and the temperature sensor 35. The current supply circuit 40 controls the current to be supplied to the bridge circuit. With an increase in ambient temperature, the resistance value of the temperature sensor 35 increases. As the resistance value of the temperature sensor 35 increases as described above, the voltage between the fixed resistor R2 and the temperature sensor 35 increases, and as this voltage increases, the current supplied from the current supply circuit 40 to the bridge circuit decreases.

The temperature of the heater 32 changes according to the magnitude of gas flow, and the operational amplifier OP1 supplies electric power to compensate for the heat of the heater 32. Explaining more specifically, when the gas flow increases to decrease the temperature of the heater 32, a resistance value (Rh) of the heater 32 decreases to reduce the input voltage on the − (minus) side of the operational amplifier, so that the voltage outputted from the operational amplifier OP1 to the bridge circuit increases. Then, the voltages applied to the heater 32 and the temperature sensor 35 increase to increase the temperature of the heater 32. Conversely, when the gas flow decreases, the output voltage from the operational amplifier OP1 to the bridge circuit decreases to decrease the temperature of the heater 32. This operation keeps the temperature of the heater 32 constant.

Further, when the ambient temperature changes and the resistance value of the temperature sensor 35 changes, the partial pressure ratio between the fixed resistor R2 and the temperature sensor 35 changes, the potential at the inverting input terminal to the operational amplifier OP1 changes and the output of the operational amplifier OP1 changes, and the output of the temperature sensor 35 changes. Explaining more specifically, an increase in the ambient temperature increases the temperature of the temperature sensor 35, and a resistance value (Rb) of the temperature sensor 35 increases. Since the fixed resistors R1, R2 are configured not to change in resistance value due to gas flow so that Rh/Rb is constant because of the balance condition of the bridge circuit, and therefore Rh increases and the temperature of the heater 32 increases. Conversely, when the ambient temperature decreases, the resistance value of the temperature sensor 35 decreases, and Rh decreases and the temperature of the heater 32 decreases.

The above-described operation compensates for the temperature of the heater 32 so that the heater 32 reaches a temperature higher by a fixed temperature than the ambient temperature. The current supply circuit 40 has a role to suppress the deviation in temperature change of the heater 32 from the change in the ambient temperature by controlling the current as described above. The operational amplifier OP1, the fixed resistors R1, R2, and the current supply circuit 40 are illustrated as a component group 42 in FIG. 11, and the component group 42 is composed of many circuit components 15 on the lower wafer 11.

Figure 12:
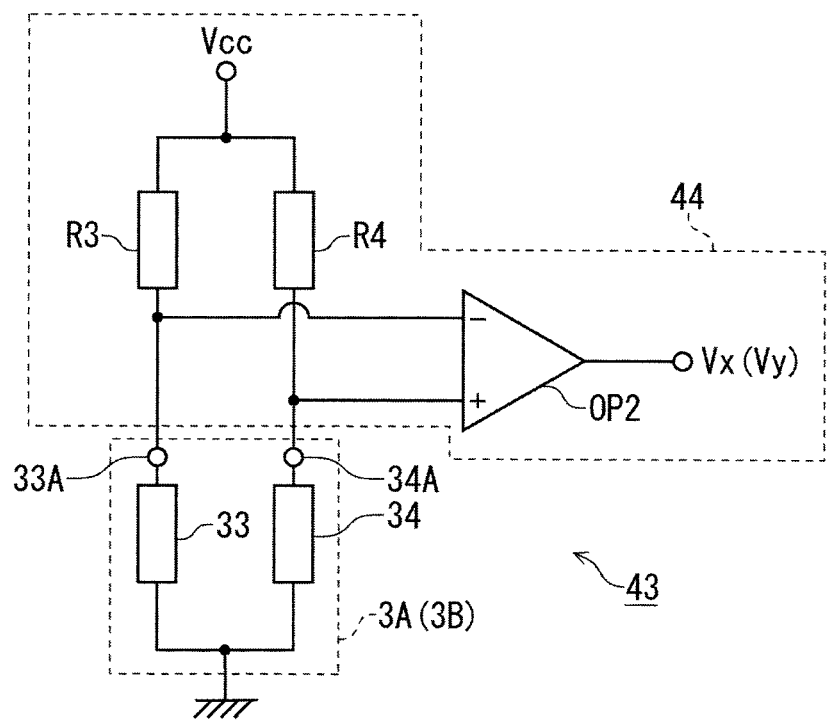
FIG. 12 is a circuit diagram composed of the upper wafer and the lower wafer constituting the measuring wafer.

Further, the thermopiles 33, 34 and the circuit components 15 provided on the lower wafer 11 constitute a wind speed detection circuit 43 illustrated in FIG. 12. Explaining the wind speed detection circuit 43, the thermopiles 33, 34 are connected in series to fixed resistors R3, R4 respectively. The midpoints between them are connected to an inverting input terminal and a non-inverting input terminal of an operational amplifier OP2 respectively. Further, the fixed resistors R3, R4 are connected to an electrode to which the power supply voltage Vcc is applied, and the thermopiles 33, 34 are connected to the ground, thereby constituting a bridge circuit. The fixed resistors R3, R4 and the operational amplifier OP2 are illustrated as a component group 44 in the drawing, and the component group 44 is composed of many circuit components 15.

The operation of the wind speed detection circuit 43 will be described also using FIG. 9, FIG. 10. In FIG. 9, FIG. 10, the distribution of heat radiated from the heater 32 is indicated as regions 37a, 37b, 37c and the regions are higher in temperature in this order. In the state where no gas flow is generated in the arrangement direction of the thermopiles 33, 34 as illustrated in FIG. 9, the thermopiles 33, 34 receive heat quantities equivalent to each other and a predetermined voltage is outputted from the operational amplifier OP2. When gas flow is formed in the arrangement direction as illustrated in FIG. 10, the heat distribution of the heater 32 becomes uneven according to the wind speed, so that the thermopile on the downstream side (33 in the drawing) becomes higher in temperature than the thermopile on the upstream side (34 in the drawing). Due to the temperature change, the resistance values of the thermopiles 33, 34 change, and the output from the operational amplifier OP2 changes according to the changes in resistance values. In short, the output from the operational amplifier OP2 changes according to the wind speed in the arrangement direction.

Figure 9:
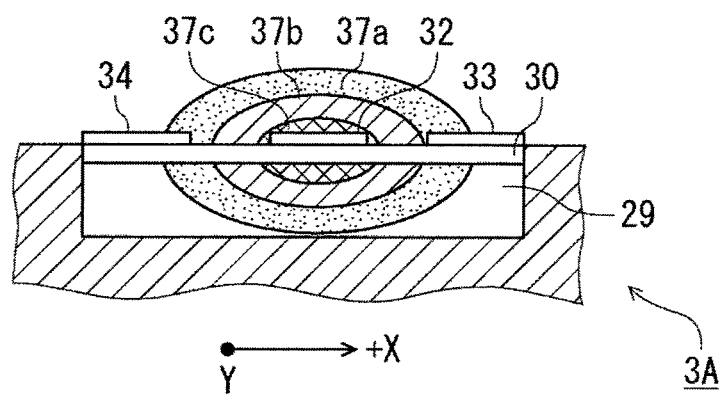
FIG. 9 is a schematic sectional view of sensors constituting the sensor pair in FIG. 8.
Figure 10:
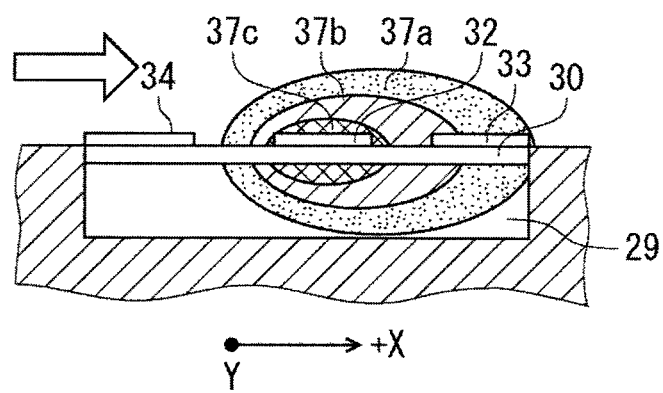
FIG. 10 is a schematic sectional view of the sensors constituting the sensor pair in FIG. 8.

In contrast to the state in FIG. 9, in the state where the temperature of the thermopile 33 becomes higher in FIG. 10, the resistance value of the thermopile 33 increases as compared to the thermopile 34, so that the input on the − (minus) side of the operational amplifier OP2 increases. Contrary to the state in FIG. 10, when gas flow is generated toward the thermopile 34 and the temperature of the thermopile 34 becomes higher, the resistance value of the thermopile 34 increases as compared to the thermopile 33, so that the input on the + (plus) side of the operational amplifier OP2 increases. Consequently, the wind speed sensors 3A, 3B can detect the wind direction in the arrangement direction and the wind speed in the arrangement direction. The output from the wind speed detection circuit 43 including the wind speed sensor 3A is expressed as Vx, and the output from the wind speed detection circuit 43 including the wind speed sensor 3B is expressed as Vy.

The wind speed sensors 3A in the sensor pairs 31 are arranged to detect the wind speed in the same direction (X-direction), and the wind speed sensors 3B in the sensor pairs 31 are arranged to detect the wind speed in the same direction (Y-direction). In the drawings, the thermopile 33 side is indicated as + (plus) and the thermopile 34 side is indicated as − (minus). The detection directions of the wind speed sensors 3A, 3B are different from each other by 90 degrees. Numerals 32A to 36A illustrated in FIG. 8 denote electrodes of the wind speed sensor 3A, 3B which constitute the wind speed detection circuit 43 and the temperature compensation circuit 41. A numeral 32B in FIG. 8 denotes a bonding wire that connects each of the electrodes 32A to 36A to the wiring pattern 20. Note that the illustration of the bonding wires 32B and the wiring patterns 20 is omitted in the other drawings such as FIG. 1.

Figure 13:
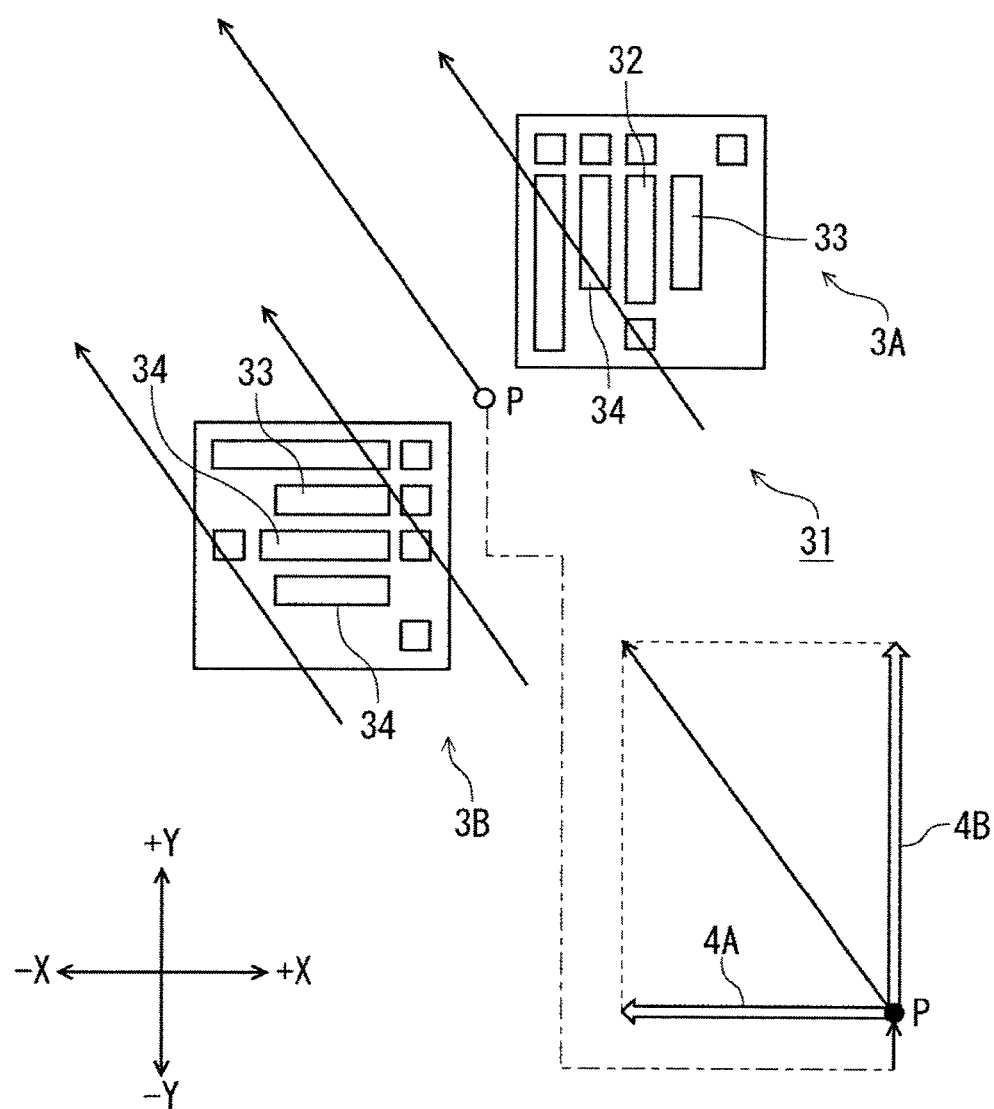
FIG. 13 is an explanatory view illustrating a measurement principle by the sensor pair.

A method of measuring gas flow by the measuring wafer 1A will be described using FIG. 13. In FIG. 13, streams of gas flows on the measuring wafer 1A are indicated by arrows. P in the drawing is a base point set close to each sensor pair 31. As has been described, the wind speed in the X-direction and the wind speed in the Y-direction are detected by the wind speed sensors 3A, 3B. Since the wind speed sensors 3A, 3B constituting the same sensor pair 31 and the base point P are arranged close to each other, it can be considered that the gas flows in the same direction and at the same wind speed are generated on the surfaces of the wind speed sensors 3A, 3B and the base point P. Further, the wind speed of the gas flow detected by the wind speed sensor 3A is the wind speed in the X-direction and therefore can be considered as a vector component 4A in the X-direction of the gas flow. Furthermore, the wind speed of the gas flow detected by the wind speed sensor 3B is the wind speed in the Y-direction and therefore can be considered as a vector component 4B in the Y-direction of the gas flow. The vector components in the X- and Y-directions are combined together as the base point P for measurement of the wind direction and the wind speed. The measurement of the wind direction and the wind speed is performed by the later-described control unit 7 based on the data on Vx, Vy transmitted from the measuring wafer 1A.

Next, different points of the upper wafer 2B constituting the measuring wafer 1B from the upper wafer 2A will be described. The upper wafer 2B outputs data on acceleration during movement of the measuring wafer 1B. The control unit 7 which has acquired acceleration data detects the rotation center position and the delivery height position of the spin chuck as described above. Since the detection methods for them are described in Japanese Laid-open Patent Publication No. 2008-109027, the schematic configuration of the upper wafer 2B and the detection method will be briefly described.

Figure 14:
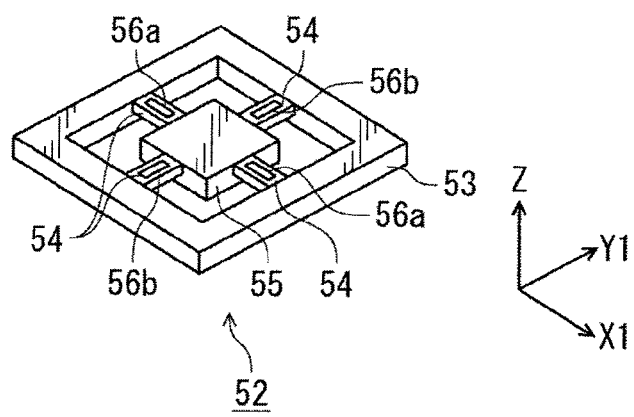
FIG. 14 is a perspective view of an acceleration sensor constituting another measuring wafer for position detection.

As illustrated in FIG. 1, on the front surface of the upper wafer 2B, a measurement unit 51 is provided in which an acceleration sensor 52 is provided to be located at the center of the upper wafer 2B. As illustrated in FIG. 14, the acceleration sensor 52 includes a horizontal frame 53 and a weight 55 supported by support parts 54 in the frame 53. The support parts 54 horizontally extend in four directions in a plane from the weight 55 to support the weight 55, and have sensor main bodies 56a to 56b each composed of a piezoelectric element provided on their front surfaces. The arrangement direction of the sensor main bodies 56a, 56a (an X1-direction in the drawing) are perpendicular to the arrangement direction of the sensor main bodies 56b, 56b (a Y1-direction in the drawing).

When acceleration acts on the acceleration sensor 52, the sensor main bodies 56a, 56b output signals according to accelerations in the horizontal X1-direction and Y1-direction respectively due to deformation of the sensor main bodies 56a, 56b. Further, based on the signals from the sensor main bodies 56a, 56b, the control unit 7 received the signals can also detect an acceleration change in a Z-direction (height direction). The sensor main bodies 56a, 56b are connected to the electrodes 24 on the rear surface of the upper wafer 2B by not-illustrated wirings. In other words, the electrodes 24 on the upper wafer 2B have a role to take out the detection signals of the acceleration sensor 52 to the lower wafer 11 and supply (feed) electric power to the acceleration sensor 52.

Figure 15:
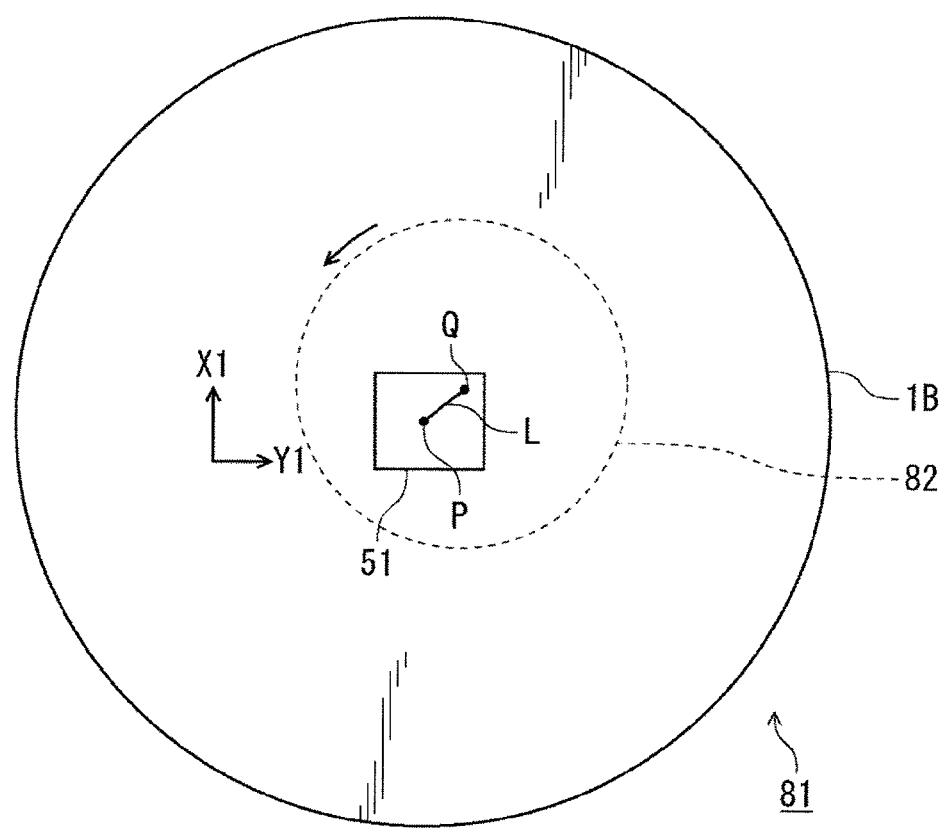
FIG. 15 is an explanatory view illustrating a measuring method by the measuring wafer for position detection.

As one example of a method of detecting the rotation center of the spin chuck by the measuring wafer 1B, the detection of the rotation center of a spin chuck 82 in a resist coating module 81 will be described. As illustrated in FIG. 15, the measuring wafer 1B is mounted on the spin chuck 82. Then, the spin chuck 82 is rotated around the vertical axis at a fixed angular speed, and the control unit 7 calculates an eccentric distance L between the spin chuck 82 and the center position of the measuring wafer 1B (the center position of the acceleration sensor 52) based on the angular speed and the received acceleration in the received X1-direction and acceleration in the Y1-direction. The center position of the measuring wafer 1B is grasped by the control unit 7 as a position in a coordinate system set by the control unit 7.

The measurement is performed three times with the position of the measuring wafer 1B on the spin chuck 82 displaced from the spin chuck 82, and the eccentric distance L is calculated every time. In each measurement, the rotation center of the spin chuck 82 is located on an arc with the center position of the measuring wafer 1B as a center and the eccentric distance L as a radius, and the control unit 7 therefore decides the intersection of arcs of the measurements as the rotation center of the spin chuck 82.

Figure 16:
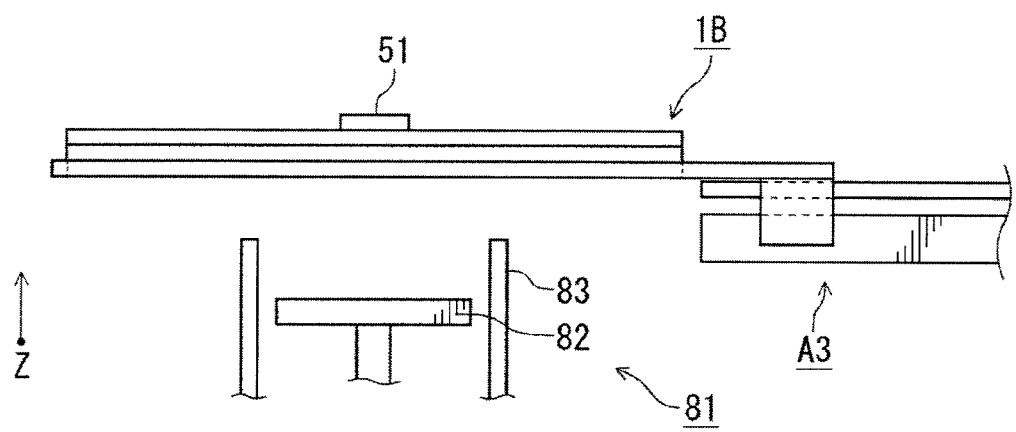
FIG. 16 is an explanatory view illustrating another measuring method by the measuring wafer.
Figure 17:
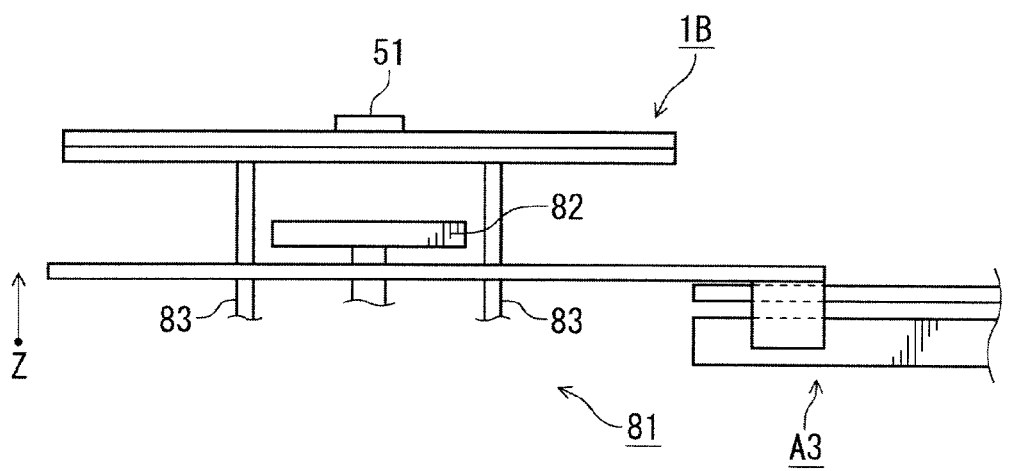
FIG. 17 is an explanatory view illustrating the another measuring method by the measuring wafer.

Subsequently, as one example of detection of the delivery height position, a detection method in the resist coating module 81 will be described. A3 in FIG. 16 denotes a carrier arm being the carrier mechanism for the wafer W. A numeral 83 in the drawing denotes a raising and lowering pin that delivers the wafer W between the carrier arm A3 and the spin chuck 82. As illustrated in FIG. 16, the carrier arm A3 holding the measuring wafer 1B is lowered with the raising and lowering pins 83 raised to the delivery position for the wafer W. When the measuring wafer 1B touches the raising and lowering pins 83 as illustrated in FIG. 17, the detected acceleration in the Z-direction changes, and the control unit 7 therefore specifies the height position of the raising and lowering pins 83 based on the change.

Next, the upper wafer 2C will be described. As illustrated in FIG. 1, temperature sensors 57 each composed of, for example, a thermocouple are buried in the upper wafer 2C in a distribution manner to radially spread in eight directions from the central portion to the peripheral portion. In this example, 29 temperature sensors 57 are provided. In FIG. 2, the temperature sensors 57 are illustrated as Ch1' to Ch29' similarly to the sensor pairs 31. The temperature sensors 57 are connected to electrodes 24 on the rear surface side of the upper wafer 2C by not-illustrated wirings as with the sensors on the other upper wafers.

Figure 2:
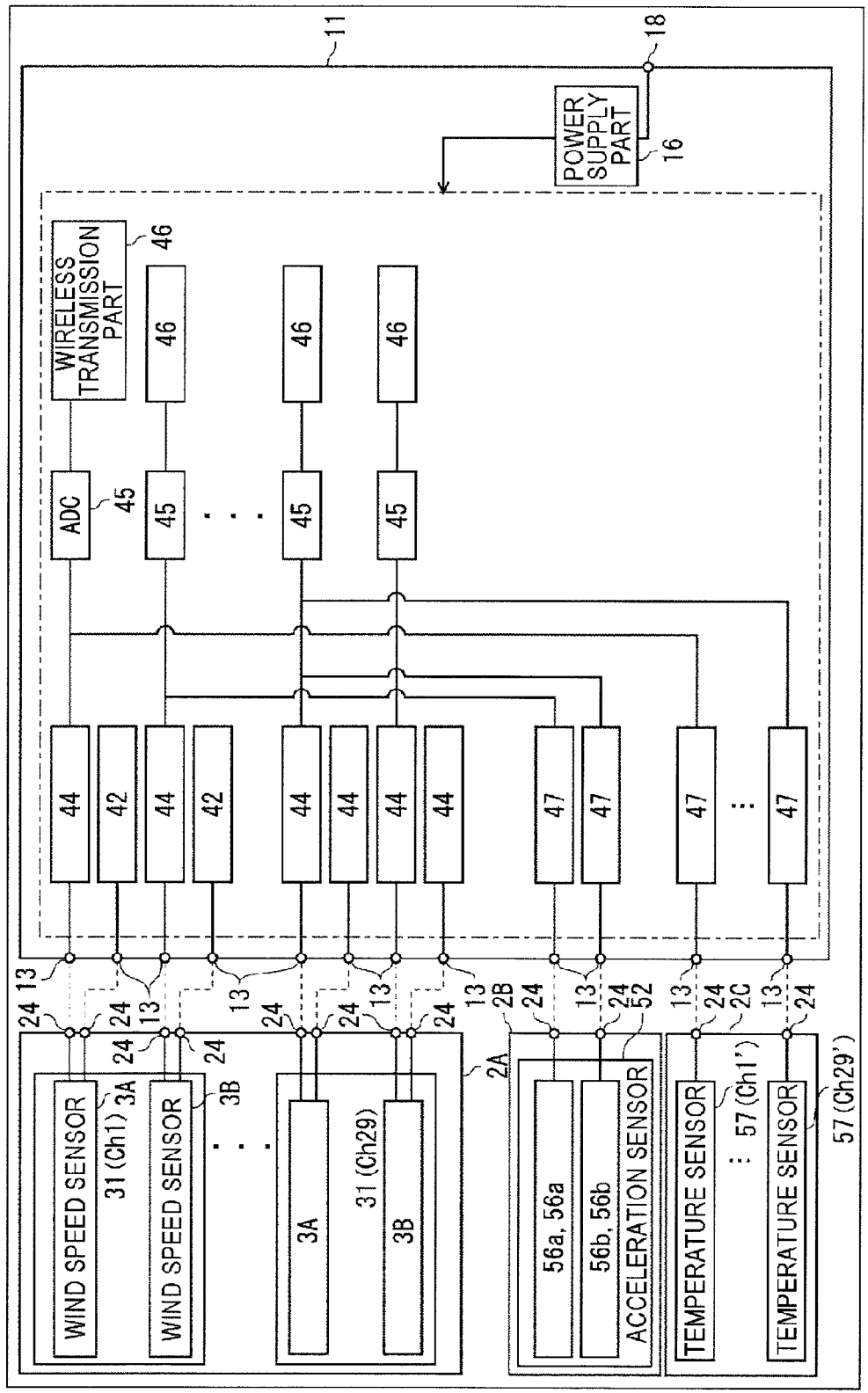
FIG. 2 is a schematic configuration diagram of circuits of the measuring wafer in FIG. 1.

The lower wafer 11 will be further described using FIG. 2. As described above, the component groups 42, 44 are provided on the lower wafer 11 for each channel of the upper wafer 2A. Further, an analog-digital convertor (ADC) 45 forming a signal processing part is provided at a stage subsequent to each component group 44, and a wireless transmission part 46 is provided at a stage subsequent to the analog-digital convertor (ADC) 45. The wireless transmission part 46 includes, for example, a communication circuit for performing wireless communication with the control unit 7, a control circuit for controlling the communication, an antenna and so on. The ADC 45 and the wireless transmission part 46 are composed of the circuit components 15. The analog signals of the voltages Vx, Vy outputted from the component group 44 are converted into digital signals and then transmitted from the wireless transmission part 46.

Further, a circuit part 47 is provide at a stage subsequent to each electrode 13 connected to the sensor main body 56a, 56b of the acceleration sensor 52. The circuit part 47 is composed of the circuit components 15, and includes amplifier circuits for amplifying the outputs from the sensor main bodies 56a, 56b respectively and a power feeding circuit for electric power supply from the power supply part 16 to the sensor. The circuit part 47 is connected to a stage preceding to the ADC 45 so that the analog acceleration data from the senor main body 56a, 56b is converted into a digital signal by the ADC 45 and transmitted from the wireless transmission part 46. Further, the circuit part 47 is similarly provided also at a stage subsequent to each electrode 13 connected to each temperature sensor 57 of Ch1' to CH29' so that an analog temperature signal outputted from the temperature sensor 57 is converted into a digital signal by the ADC 45 and transmitted from the wireless transmission part 46.

Figure 18:
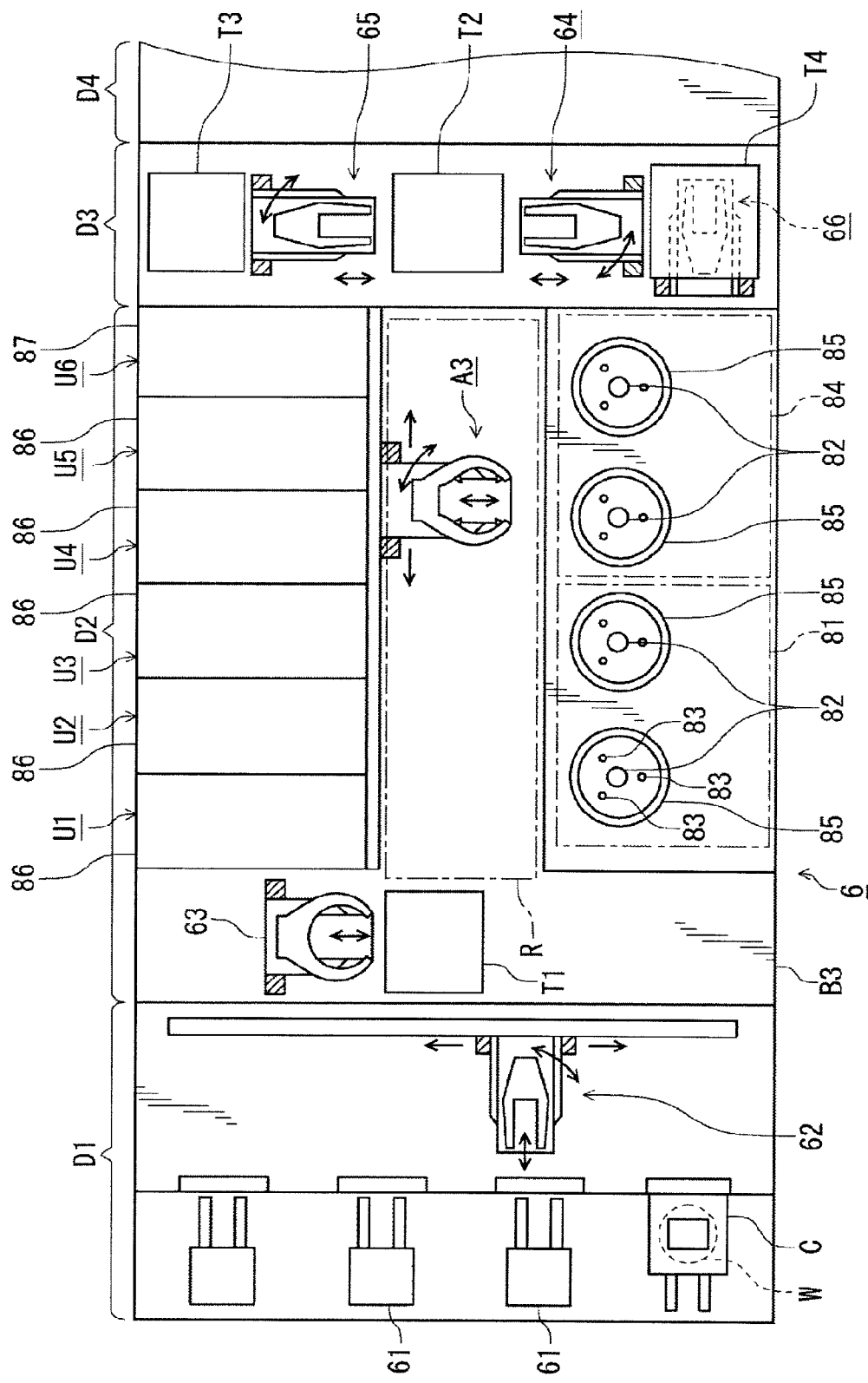
FIG. 18 is a plan view of a coating and developing apparatus in which the measuring wafer is used.
Figure 19:
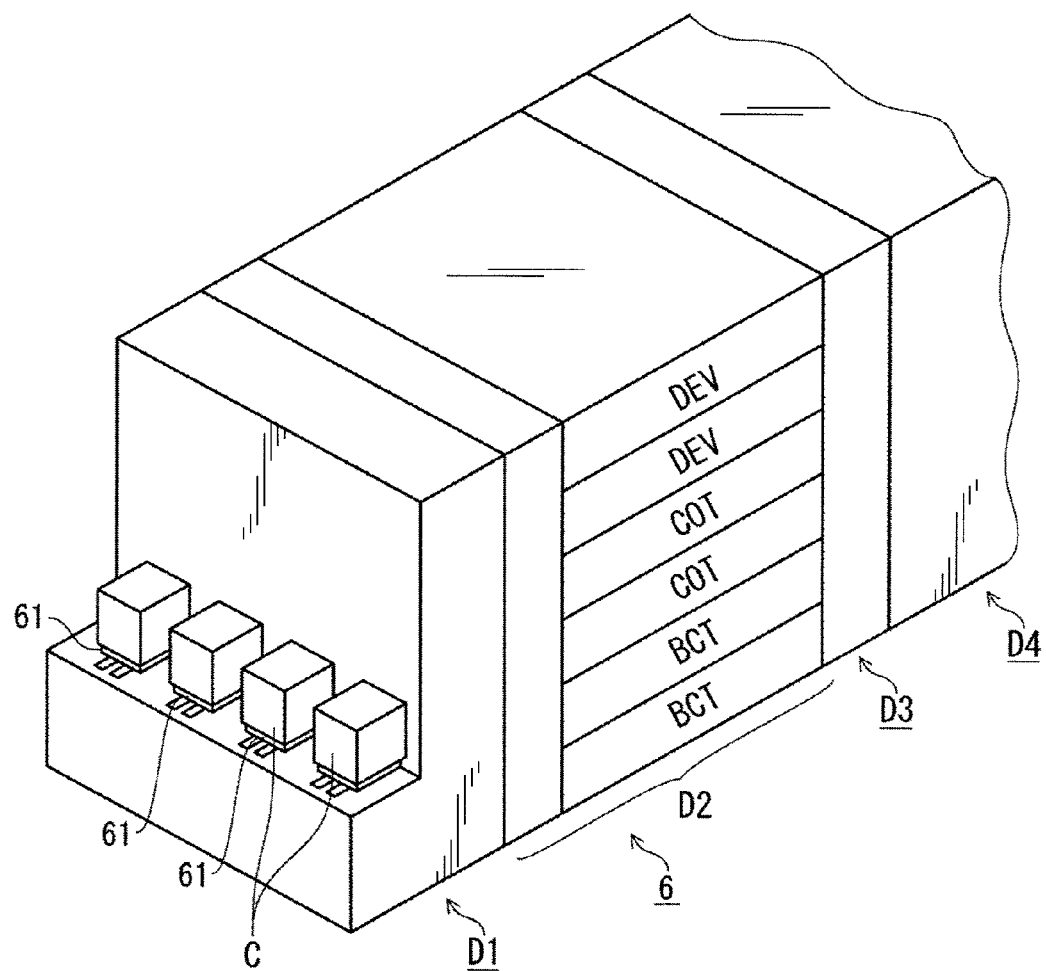
FIG. 19 is a perspective view of the coating and developing apparatus in FIG. 18.
Figure 20:
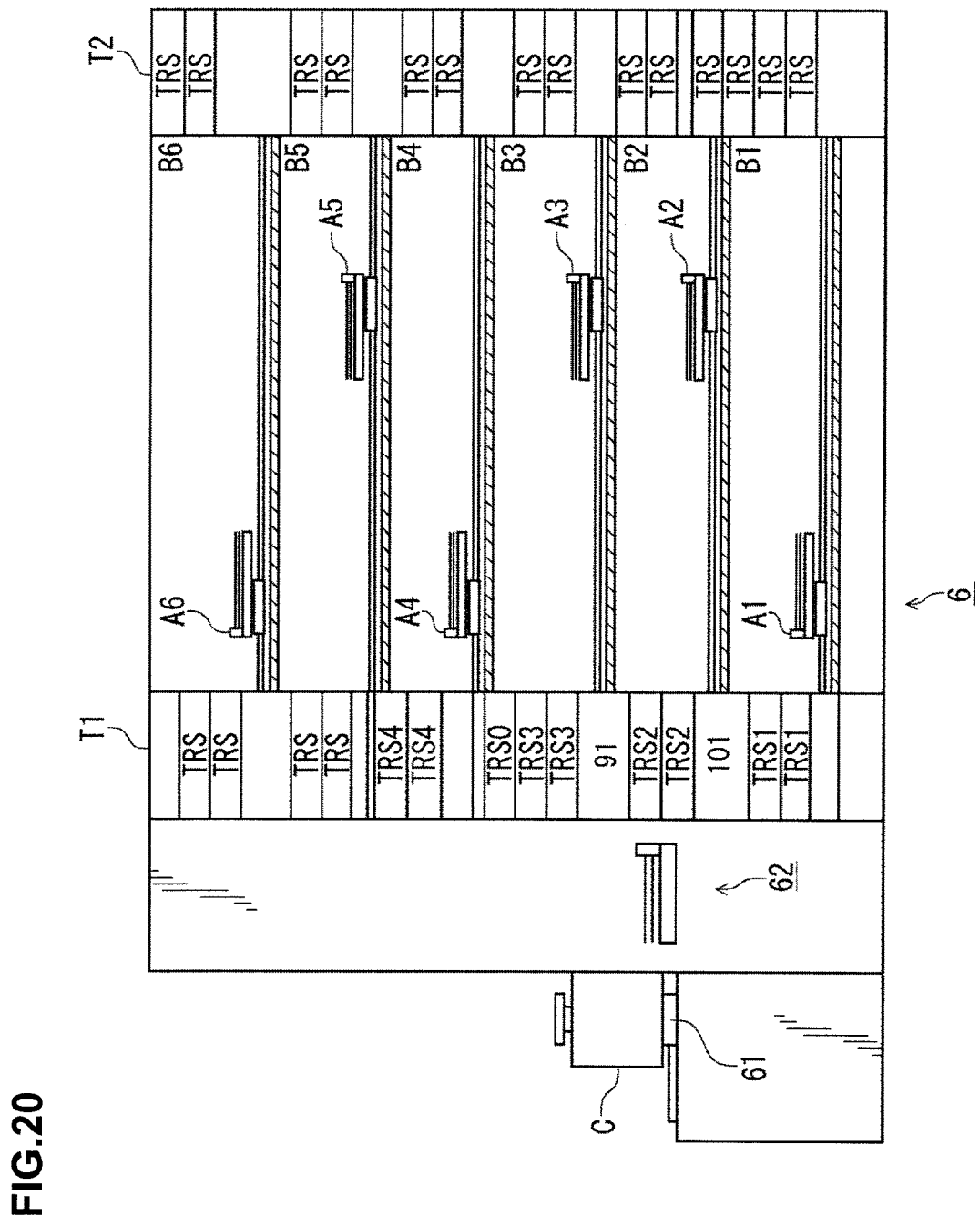
FIG. 20 is a schematic longitudinal sectional view of the coating and developing apparatus in FIG. 18.

Next, an example of the coating and developing apparatus 6 will be described referring to FIG. 18 to FIG. 20. FIG. 18, FIG. 19, FIG. 20 are a plan view, a perspective view, and a schematic longitudinal sectional view of the coating and developing apparatus 6 respectively. The coating and developing apparatus 6 includes a carrier block D1, a treatment block D2, and an interface block D3 that are linearly arranged. To the interface block D3, an exposure apparatus D4 is connected. In the following description, the arrangement direction of the blocks D1 to D3 is regarded as a front-back direction. The carrier block D1 has a role to deliver a carrier C including the wafer W to/from a not-illustrated carrier mechanism, and includes a mounting table 61 for the carrier C and a transfer mechanism 62 for carrying the wafer W from the carrier C.

The treatment block D2 is composed of first to sixth unit blocks B1 to B6 for performing solution treatment on the wafer W which are stacked in order from the bottom. For convenience of the explanation, treatment of forming an anti-reflection film on the lower side of the wafer W is expressed as "BCT," treatment of forming a resist film on the wafer W is expressed as "COT," and treatment for forming a resist pattern on the wafer W after exposure is expressed as "DEV" respectively in some cases. Further, the unit block is expressed as "floor" in FIG. 19 to avoid complication of description. In this example, two floors of each of the BCT floor, the COT floor, and the DEV floor are stacked from the bottom, and the COT floor B3 will be described as a representative referring to FIG. 18. Shelf units U1 to U6 are arranged in the front-back direction on one of right and left sides of a carry region R from the carrier block D1 toward the interface block D3, and the resist coating module 81 and a protective film forming module 84 which are solution treatment modules are provided arranged in the front-back direction on the other side. To the carry region R, air is supplied from a not-illustrated air supply part.

The resist coating module 81 includes the spin chuck 82 as described above. A numeral 85 in the drawing denotes a cup that exhausts air supplied from a ceiling portion of the module during the spin coating. The illustration of a treatment solution nozzle for supplying a resist and a solvent nozzle for removing an edge portion of a resist film is omitted. The protective film forming module 84 is configured such that treatment is similarly performed with a treatment solution for forming a protective film.

In the carry region R, the carrier arm A3 that is the carrier mechanism for the wafer W is provided. The carrier arm A3 is configured to be movable forward and backward, movable up and down, rotatable around the vertical axis, and movable in a direction of the length of the carry region R, and can deliver the wafer W between modules in the unit block B3. Further, the shelf units U1 to U6 are arranged along the direction of the length of the carry region R, and each of the shelf units U1 to U5 is configured such that heating modules 86 each performing heat treatment on the wafer W are stacked, for example, at two tiers. The shelf unit U6 is composed of edge exposure modules 87 stacked one above the other.

The edge exposure module 87 includes an exposure part that exposes the edge of the wafer W, a stage that supports the rear surface of the wafer W and is freely rotatable and movable in the lateral direction, and an optical sensor that decides the edge position of the wafer W in order to control the width for exposure. The optical sensor is composed of a light projecting part that projects light to the edge of the rotated wafer W and a light receiving part that is paired with the light projecting part, and the control unit 7 detects the edge position of the wafer W based on the incident range of the light which the light receiving part receives from the light projecting part. As will be described later, in the case of using the measuring wafer 1A to 1C, the orientation of the notch N of the measuring wafer 1A to 1C is detected based on the incident range, and the orientation is adjusted by the stage.

The unit block B4 is configured similarly to the unit block B3. The other unit blocks B1, B2, B5 and B6 are configured similarly to the unit blocks B3, B4 except that the treatment solution to be supplied to the wafer W is different and that the heating module 86 is provided in placed of the edge exposure module 87. The unit block B1, B2 includes an anti-reflection film forming module and the unit block B5, B6 includes a developing module, in place of the resist coating module 81 and the protective film forming module 84. In FIG. 20, carrier arms in the unit blocks B1 to B6 are indicated as A1 to A6.

On the carrier block D1 side in the treatment block D2, a tower T1 vertically extending throughout the unit blocks B1 to B6 and a delivery arm 63 that is a carrier mechanism movable up and down for delivering the wafer W to/from the tower T1 are provided. The tower T1 is composed of a plurality of modules stacked one above the other. Though various kinds of modules are actually provided in the tower T1, only delivery modules TRS each for delivering the wafer W between the delivery arm 63 and each of the carrier arms A1 to A6 of the unit blocks B1 to B6, and later-described storage module 91 and attaching/detaching module 101 are illustrated for simplification of explanation.

The interface block D3 includes towers T2, T3, T4 vertically extending throughout the unit blocks B1 to B6. Numerals 64, 65, 66 denote interface arms. The arm 64 delivers the wafer W to/from the tower T2 and the tower T4, the arm 65 delivers the wafer W to/from the tower T2 and the tower T3, and the arm 66 delivers the wafer W between the tower T4 and the exposure apparatus D4. The tower T2 is composed of delivery modules TRS stacked one above the other. Note that the description of T3 and T4 will be omitted.

The outline of a carry path for the wafer W in a system composed of the coating and developing apparatus 6 and the exposure apparatus D4 will be briefly described. The wafer W flows in the order of the carrier C, the transfer mechanism 62, the delivery module TRS in the tower T1, the delivery arm 63, the delivery module TRS in the tower T1, the unit block B1 (B2), the unit block B3 (B4), the interface block D3, the exposure apparatus D4, the interface block D3, the delivery module TRS in the tower T1, the transfer mechanism 62, and the carrier C.

Describing the flow of the wafer W in the treatment block D2 in more detail, the unit blocks B1, B2 each forming an anti-reflection film, the unit blocks B3, B4 each forming a resist film, and the unit blocks B5 B6 each performing development are duplex, and the wafers W are carried in a distribution manner to the duplex unit blocks. For example, when the wafer W is delivered to the unit block B1, the wafer W is delivered by the delivery arm 63 to the delivery module TRS1 (the delivery module to/from which the wafer W can be delivered by the carrier arm A1) corresponding to the unit block B1 among the delivery modules TRS in the tower T1. The module from which the delivery arm 63 receives the wafer W in the tower T1 is a delivery module TRS0 into which the wafer W is carried by the transfer mechanism 62. Further, when the delivery module corresponding to the unit block B2 is TRS2, the wafer W in the delivery module TRS0 is delivered by the delivery arm 63 to the delivery module TRS2.

Further, the wafers W after the anti-reflection film is formed in the unit block B1 or B2 are carried in a distribution manner alternately to the delivery module TRS3 corresponding to the unit block B3 and the delivery module TRS4 corresponding to the unit block B4, for example, via the delivery module TRS1 or TRS2. This carry is performed by the delivery arm 63.

Incidentally, the place where the wafer W is to be mounted is described as the module. The module is provided with a not-illustrated sensor for detecting carry-in/out of the wafer W. When the wafer W is carried into and carried out of each module, a carry-in signal and a carry-out signal indicating that the carry-in and carry-out are performed are transmitted from each sensor to the control unit 7. Air is exhausted at a predetermined set rate at all times in each module, and air is supplied at a predetermined rate at all times in each of the carry region R, predetermined modules such as a resist coating module 81 and so on.

Figure 21:
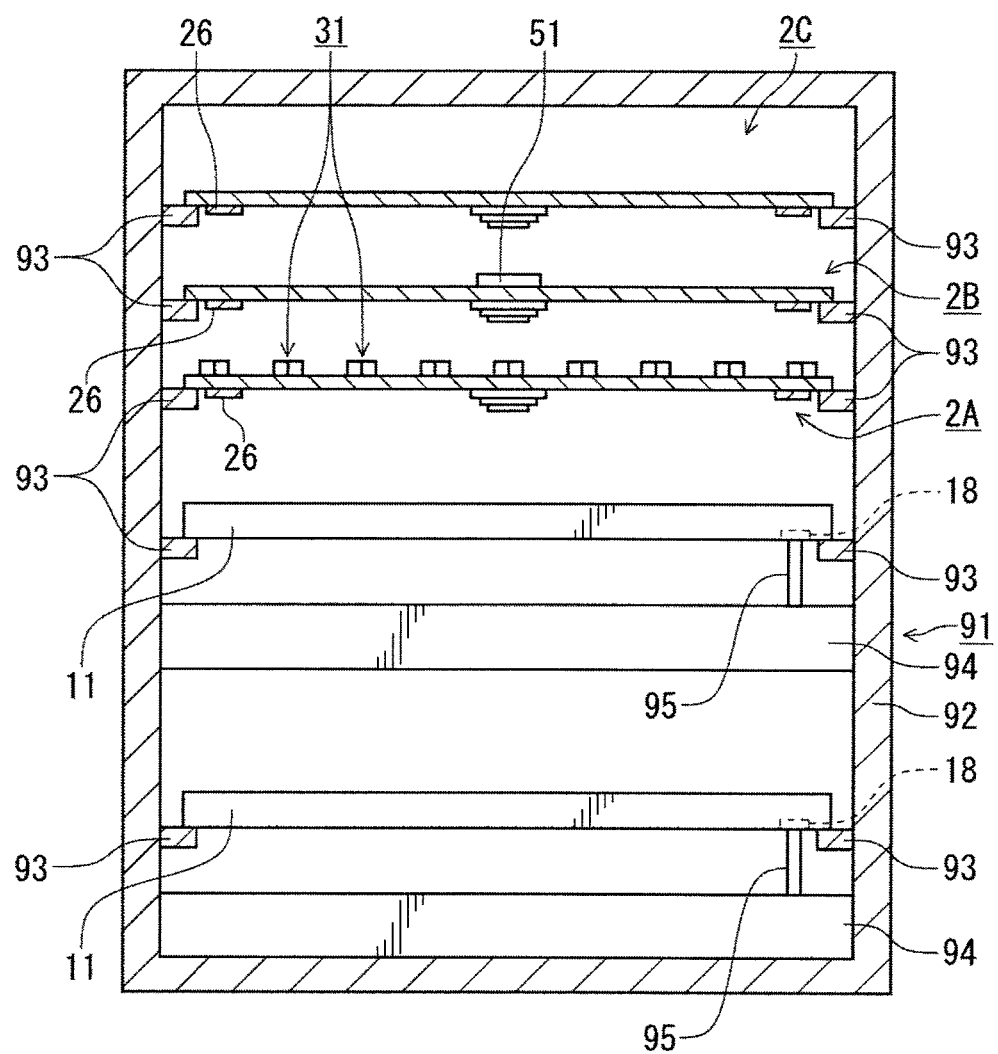
FIG. 21 is a longitudinal front view of a storage module provided in the coating and developing apparatus in FIG. 18.
Figure 22:
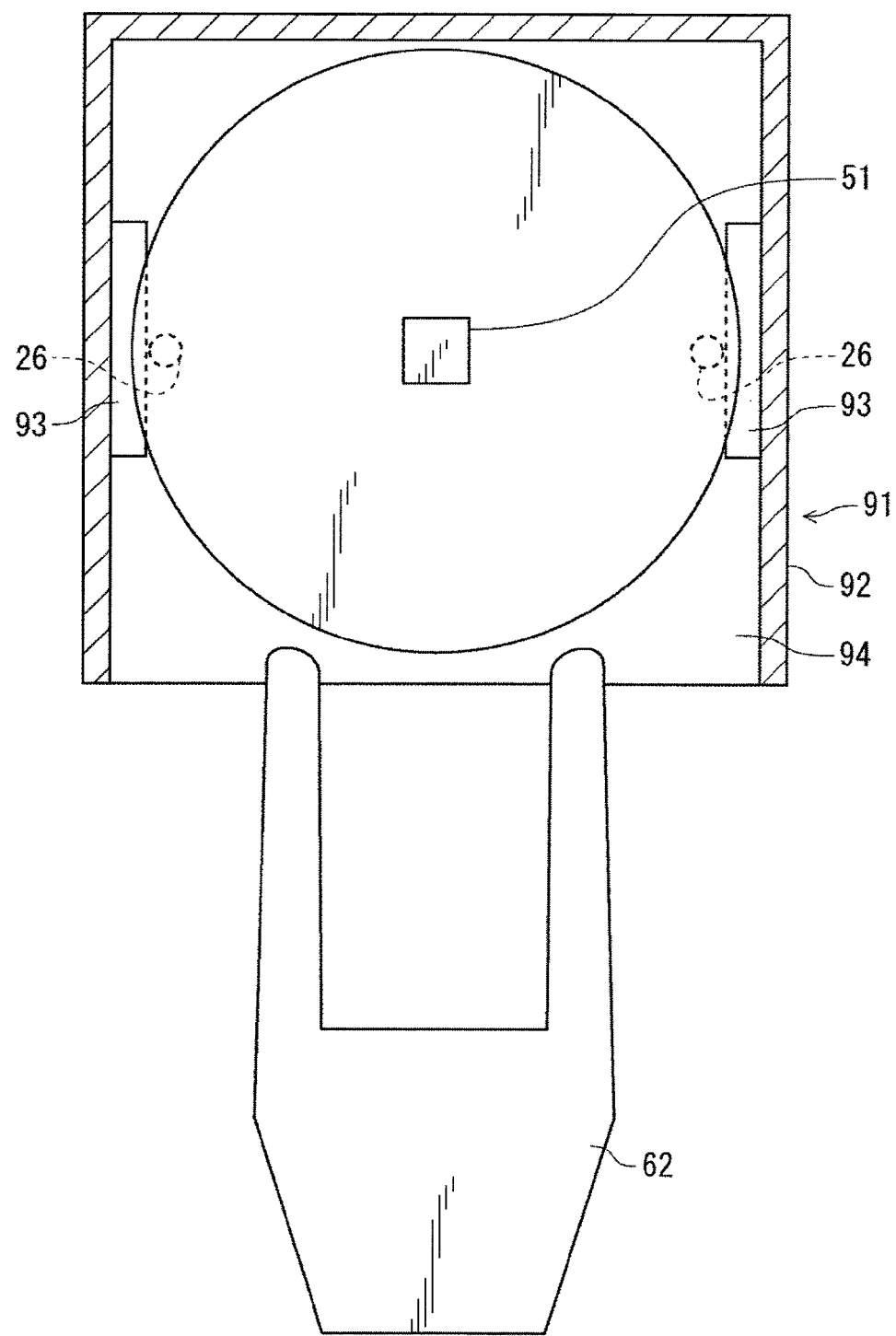
FIG. 22 is a transverse plan view of the storage module in FIG. 21.

For example, in the tower T1, the storage module 91 constituting a storage part that stores the upper wafers 2A to 2C and the lower wafers 11 in the state that they are separated from each other, and the attaching/detaching module 101 that attaches and detaches the upper wafer 2A to 2C to/from the lower wafer 11 are provided. FIG. 21, FIG. 22 are a front view and a transverse plan view of the storage module 91 respectively. In this storage module 91, the upper wafers 2A to 2C and two lower wafers 11 are stored one above the other with space intervening between them. The storage module 91 includes a housing 92 in which support parts 93 are provided. The support parts 93 horizontally support the edge portion of the rear surface of each of the lower wafers 11 and the upper wafers 2A to 2C

In the housing 92, power supply feeding parts 94, 94 are provided. A numeral 95 in the drawing denotes a pin projecting upward from each power supply feeding part 94. When the lower wafer 11 is supported by the support parts 93, the pin 95 comes into contact with the electrode 18 for charging the wafer 11. Electric power is fed from the power supply feeding part 94 to the power supply part 16 via the pin 95 and the electrode 18 to charge the power supply part 16.

Figure 23:
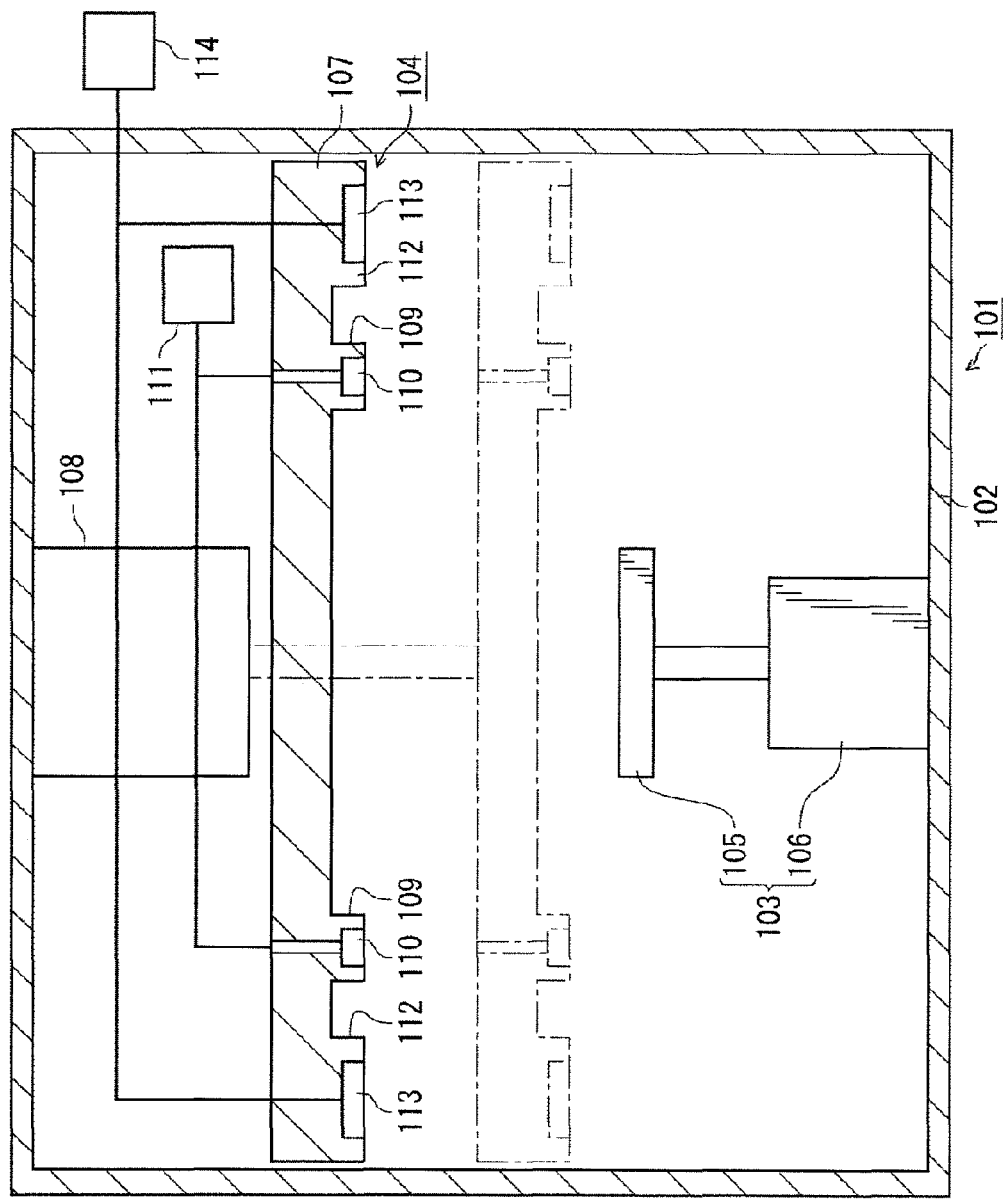
FIG. 23 is a longitudinal front view of an attaching/detaching module provided in the coating and developing apparatus.
Figure 24:
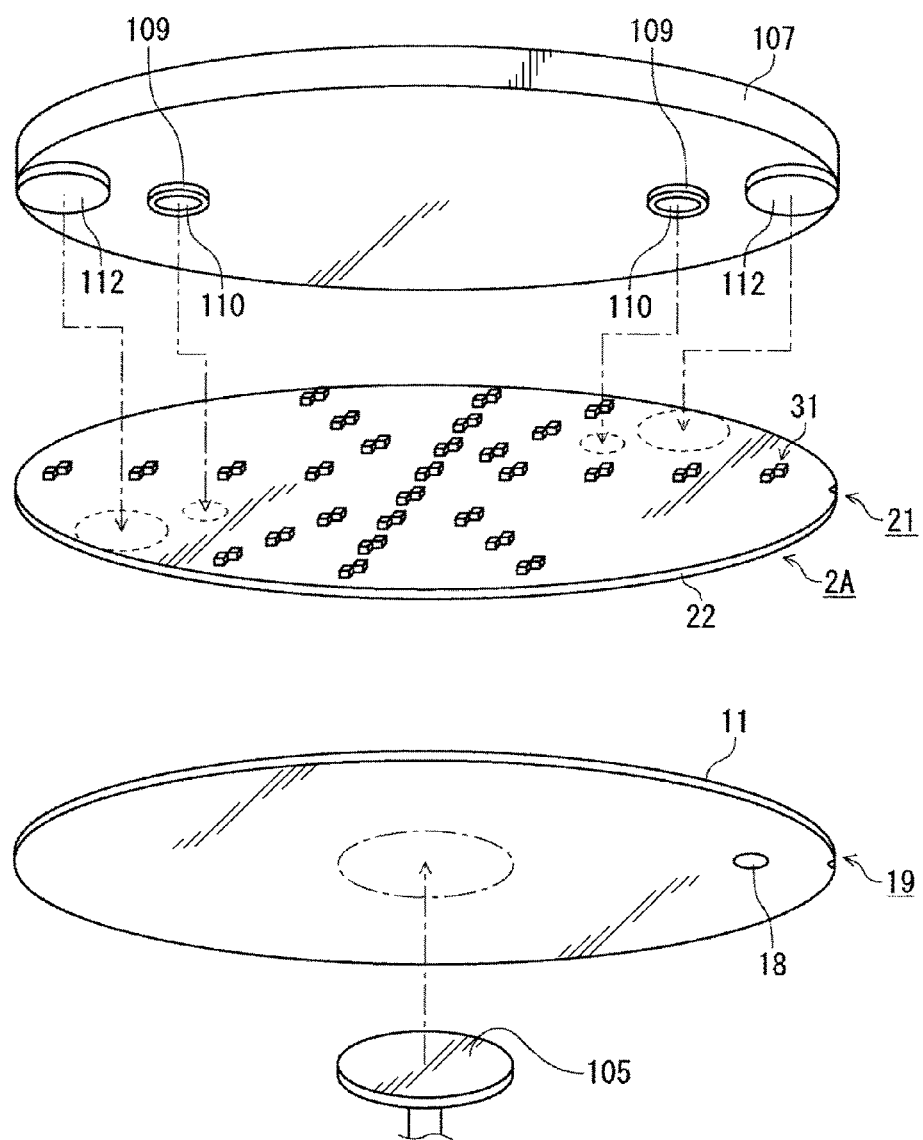
FIG. 24 is a perspective view of parts of the attaching/detaching module.

Next, the attaching/detaching module 101 will be described referring to FIG. 23 being a front view thereof and FIG. 24 being a perspective view of components of the attaching/detaching module 101. The attaching/detaching module 101 includes a housing 102 provided with a not-illustrated carry port, and a lower wafer holding part 103 and an upper wafer holding part 104 are provided in the housing 102. The lower wafer holding part 103 is composed of a spin chuck 105 and a rotation drive mechanism 106. The spin chuck 105 includes a not-illustrated suction port that sucks the middle portion of the rear surface of the lower wafer 11 to horizontally hold the lower wafer 11. The spin chuck 105 is rotated around the vertical axis by the rotation rive mechanism 106.

The upper wafer holding part 104 is composed of a holding part main body 107 and a raising and lowering mechanism 108. The holding part main body 107 is formed, for example, in a circular shape, and a projecting portions 109 are provided at positions close to the edge portion of the lower surface thereof. As will be described later, each of the upper wafers 2A to 2C is carried, in a predetermined orientation, to the attaching/detaching module 101. The projecting portions 109 are formed not to interfere with the sensors on the surface of the upper wafer 2A to 2C when holding the carried upper wafer 2A to 2C. At lower portions of the projecting portions 109, suction ports 110 are provided. The suction ports 110 are connected to an exhaust part 111 via an exhaust pipe, and the front surface of the upper wafer 2A to 2C is held on the holding part main body 107 by exhaust from the suction ports 110.

At the edge portion of the lower surface of the holding part main body 107, projections 112 are provided. In the projections 112, electromagnets 113 are buried. The electromagnets 113 are connected to an electric power supply part 114, so that their states are switched between an excited state and a non-excited state by supply and stop of electric power from the electric power supply part 114. The upper wafer 2A to 2C is carried, in a predetermined orientation, to the attaching/detaching module 101, and the projections 112 are provided at positions superposed on the stoppers 26 of the carried upper wafer 2A to 2C and can raise and lower the stoppers 26 by switching between the excited state and the non-excited state.

Figure 25:
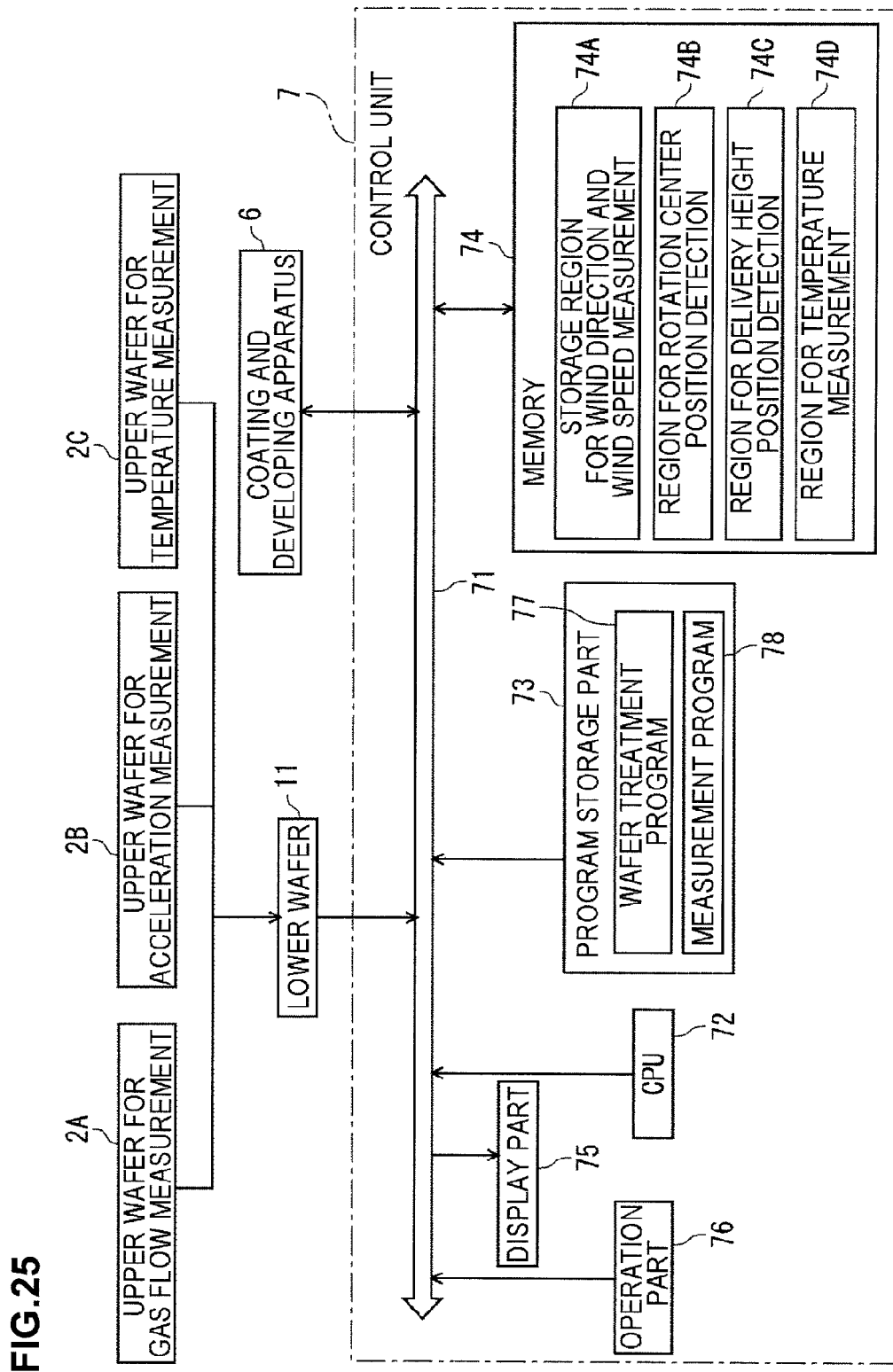
FIG. 25 is a schematic diagram of a control unit provided in the coating and developing apparatus.

Next, the control unit 7 will be described. FIG. 25 illustrates the configuration of the control unit 7. The control unit 7 includes a bus 71 to which a CPU 72, a program storage part 73, a memory 74, a display part 75, and an operation part 76 are connected. In the program storage part 73, programs 77, 78 are stored. The program 77 is a program for treating the wafer W and transmits control signals to the parts in the coating and developing apparatus 6 to control operations of the carrier mechanism for the wafer W and the modules. Thus, the carry of and treatments on the wafer W are performed as described above. The program 78 is a measurement program using the measuring wafers 1A to 1C, and transmits control signals to the parts of the coating and developing apparatus 6 to perform the above-described measurements. This controls the operations such as combination and separation of the upper wafer and the lower wafer, carry of the measuring wafer, measurement by the measuring wafer, display of measurement results and so on. A user of the coating and developing apparatus 6 can select and execute either a treatment mode of performing treatments on the wafer W or a measurement mode of performing various kinds of measurements from the operation part 76, and the program 77 or 78 operates according to the selected mode. The program storage part 73 is composed of a computer storage medium, for example, a flexible disk, a compact disk, a hard disk, an MO (magneto-optical disk) or the like.

Figure 26:
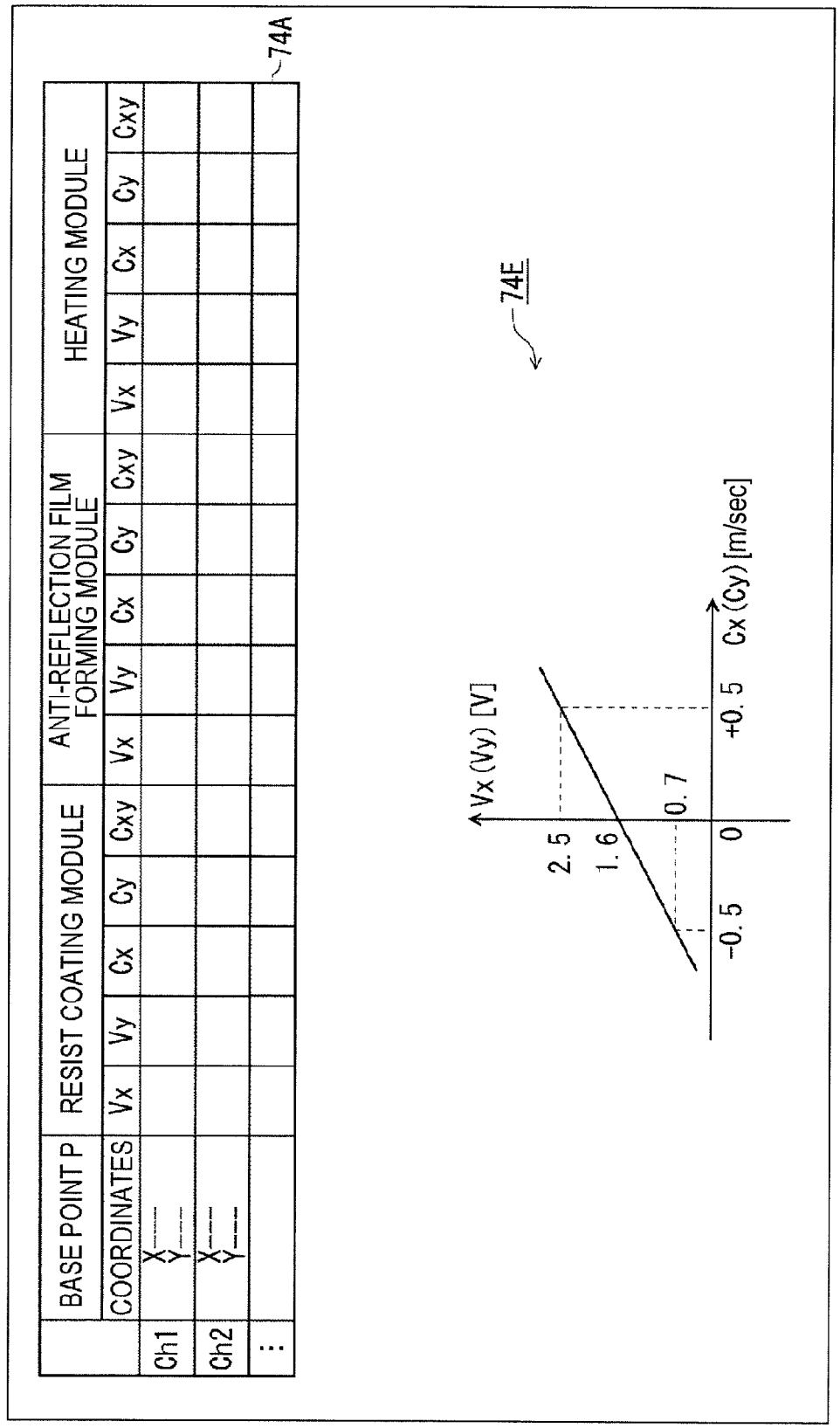
FIG. 26 is a schematic chart of a memory provided in the control unit in FIG. 25.

The memory 74 will be described. During execution of the measurement mode, measurement data is stored in different storage regions of the memory 74 depending on the kind of measurement to be executed. Further, depending on the kind of measurement, data required for the measurement has been stored in the storage region. The storage regions will be described while indicating the storage region used for measurement of the wind direction and the wind speed as 74A, the storage region used for detection of the rotation center position as 74B, the storage region used for detection of the delivery height position as 74C, and the storage region used for measurement of the temperature as 74D. FIGS. 26, 27 schematically illustrate the storage regions 74A to 74D.

The storage region 74A for measurement of the wind direction and the wind speed in FIG. 26 will be described. As indicated in a table on the upper side in FIG. 26, the voltages Vx, Vy transmitted by wireless, wind speeds Cx, Cy in the X-direction and the Y-direction calculated from Vx, Vy respectively, and a wind speed Cxy calculated from Cx, Cy using the above-described point P as the base point are stored in the storage region 74A for each of the above-described channels. Further, XY coordinates of the above-described base point P on the measuring wafer 1A are stored. Furthermore, as illustrate in a graph 74E on the lower side in FIG. 26, the correspondence for calculating Cx, Cy from Vx, Vy, is stored in the storage region 74A. The longitudinal axis of the graph indicates the voltages Vx, Vy (unit: V), and the horizontal axis indicates the wind speeds Cx, Cy (unit: m/sec). Cxy is a wind speed using the point P as the base point, and $Cxy=\{(Cx)^2+(Cy)^2\}^{1/2}$. Since the measurement is performed for each module, Vx, Vy, Cx, Cy, Cxy are stored in association with each module. Though not illustrated, Vx, Vy are actually acquired continuously and stored for each time in the storage region 74A, so that arbitrary Cx, Cy, Cxy during the measurement time can be calculated.

In the storage region 74B for detection of the rotation center position illustrated in FIG. 27, the data on the accelerations in the X1-direction and the Y1-direction outputted from the respective sensor main bodies 56a, 56b and the above-described eccentric distance L calculated from the acceleration data are stored for each module for which the measurement has been performed. Since the measurement is performed three times for one module as described above, the acceleration data and the eccentric distance L are stored for each time of measurement. Further, the coordinates of the rotation center position calculated from the eccentric distance in each time of measurement are stored for each module.

In the storage region 74C for detection of the delivery height position, the acceleration data outputted from the sensor main bodies 56a, 56b and acceleration data in the Z-direction (height direction) calculated from the above acceleration data are stored for each module for which measurement has been performed. The acceleration data is stored continuously during the measurement time. Time points in each measurement time are expressed as t1, t2, . . . in the drawing. Then, the coordinates of the delivery height position in each module calculated from the change in the acceleration in the Z-direction are stored in the storage region 74C. In the storage region 74D for temperature measurement, the output value of the temperature sensor 57 of each channel and a detection temperature calculated from the output value are stored for each heating module for which measurement is performed.

Returning to FIG. 25, the operation part 76 will be described. The operation part 76 is composed of a mouse, a keyboard, a touch panel and so on. The user can perform instructions of selection of the treatment mode and the measurement mode, selection of measurement kind to be executed in the measurement mode, selection of a module for which measurement is to be performed, selection of a carry path for the measuring wafer 1A, display of measurement result on the display part 75 regarding the module for which measurement has been performed and so on, from the operation part 76.

Figure 28:
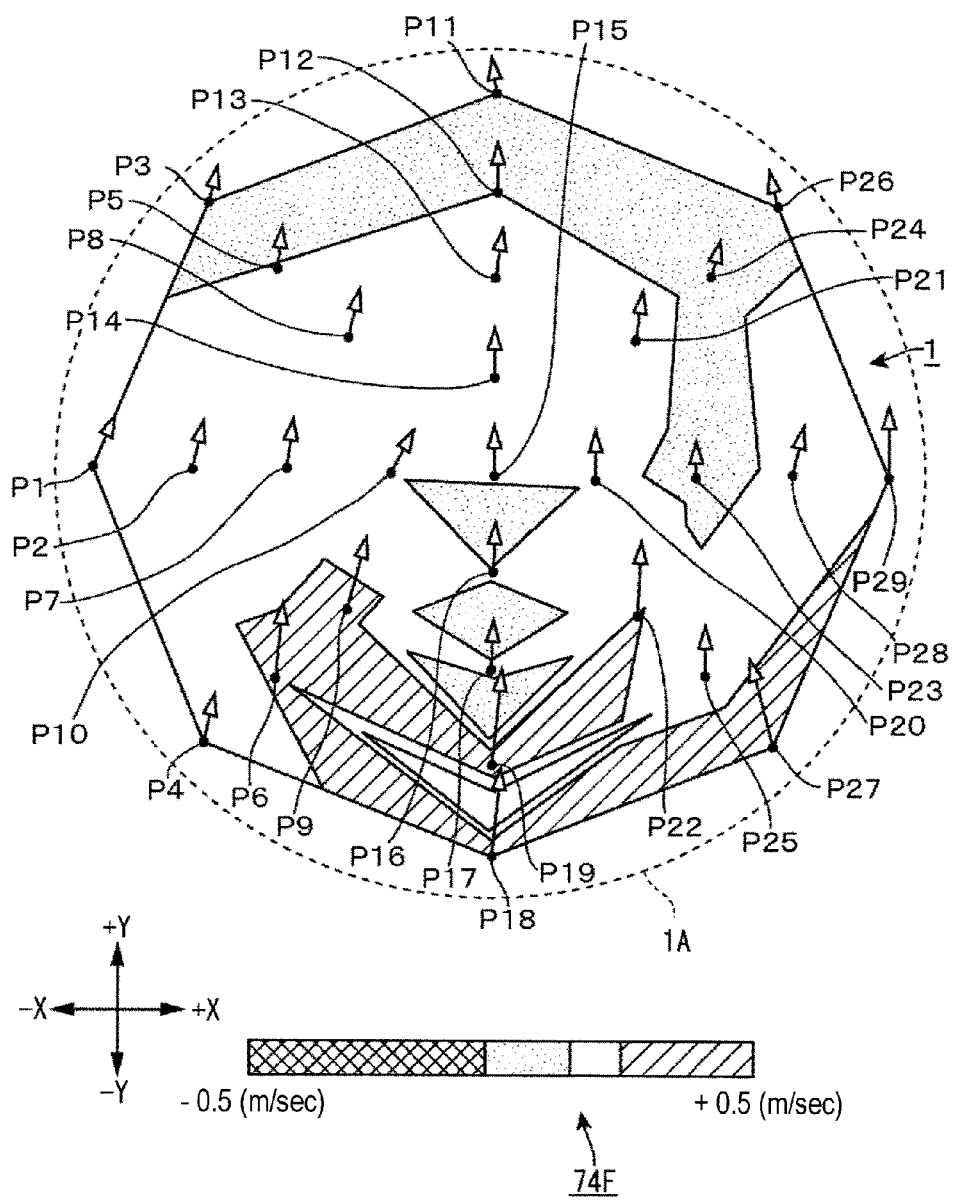
FIG. 28 is an explanatory view illustrating a display example of gas flow measurement result.

The display part 75 is a display on which display is performed based on the data stored in the storage regions 74A to 74D. FIG. 28 illustrates an example of the display of result of measurement of gas flow performed for the heating module 86 as will be described later. Based on set coordinates, base points P are displayed at predetermined places on the display part 75 and the calculated wind directions are displayed as arrows extending from the base points P. The base points P in the drawing are indicated with numbers corresponding to channels.

The arrow is displayed longer as the calculated wind speed Cxy is larger. Further, the outer shape of the measuring wafer 1A is displayed on the display part 75, and colors according to the calculated wind speeds Cxy of the channels are displayed within the outer shape. Though the wind speed distribution is indicated by gradation of the colors in an actual image display, the wind speed distribution is indicated using contour lines, instead of the gradation of the colors, with the addition of patterns according to the strength of the wind speed for convenience in FIG. 28. Further, a bar 74F indicating the correspondence between the colors in gradation and the numerical values of the wind speed Cxy is displayed. This enables the user to recognize the value of the wind speed Cxy at each portion within the measuring wafer 1A, that is, on the wafer W on the mounting part. Similarly, the measured rotation center position coordinates, delivery height position coordinates, and temperature can also be displayed on the display part 75. As this display, tables, for example as illustrated in FIG. 27, in which the modules are associated with the rotation center position coordinates, the delivery height position coordinates, and the temperature of each channel are displayed respectively.

Next, the procedure of performing measurement of gas flow by the measuring wafer 1A will be described. First, the user selects the measurement mode, and then performs selection to measure the wind direction and the wind speed in the measurement mode. Then, the user sets a module for which the measurement is performed, and a carry path for the measuring wafer 1A to be carried to the module. Here, it is assumed that the heating module 86 in the unit block B3 is selected as the module for which the measurement is performed.

Figure 29:
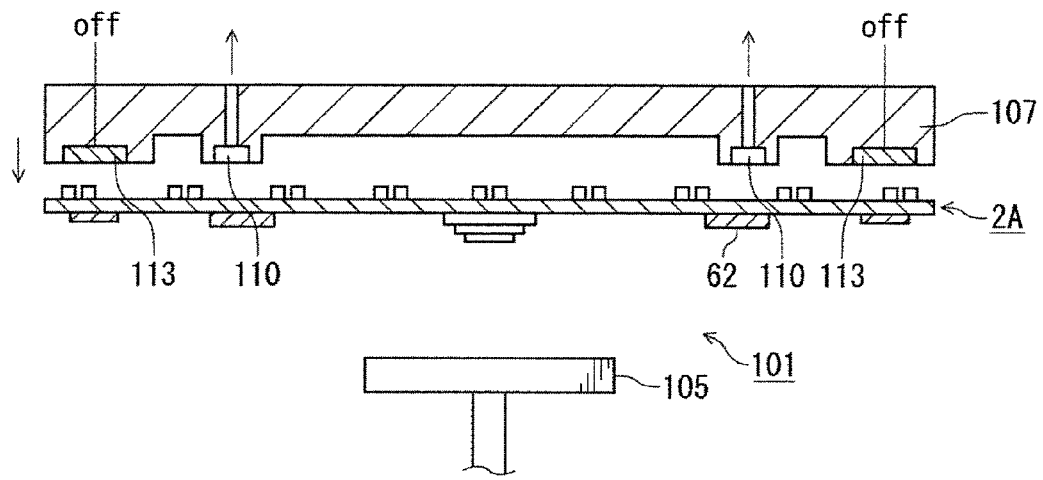
FIG. 29 is a process chart illustrating a process of combining the upper wafer and the lower wafer by the attaching/detaching module.
Figure 30:
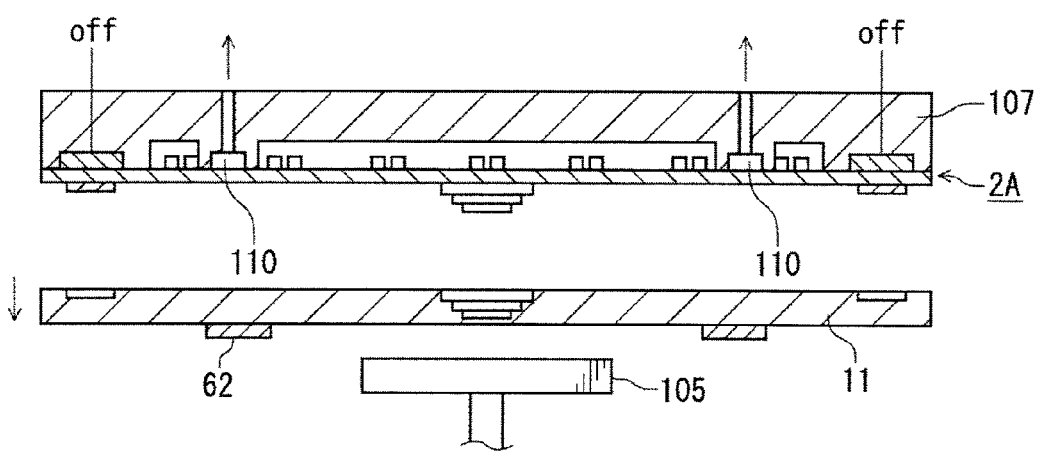
FIG. 30 is a process chart illustrating the process of combining the upper wafer and the lower wafer by the attaching/detaching module.

The transfer mechanism 62 receives the upper wafer 2A from the storage module 91 and carries the upper wafer 2A to the attaching/detaching module 101 as illustrated in FIG. 29. When the upper wafer 2A is located below the holding part main body 107, the holding part main body 107 is lowered toward the upper wafer 2A and suction from the suction ports 110 is started to suction-hold the front surface of the upper wafer 2A to the holding part main body 107. Subsequently, the transfer mechanism 62 receives the lower wafer 11 from the storage module 91 and carries the lower wafer 11 to the attaching/detaching module 101. The transfer mechanism 62 located above the spin chuck 105 is lowered (FIG. 30), and the middle portion of the rear surface of the lower wafer 11 is sucked through the not-illustrated suction port of the spin chuck 105, whereby the lower wafer 11 is held on the spin chuck 105.

Figure 31:
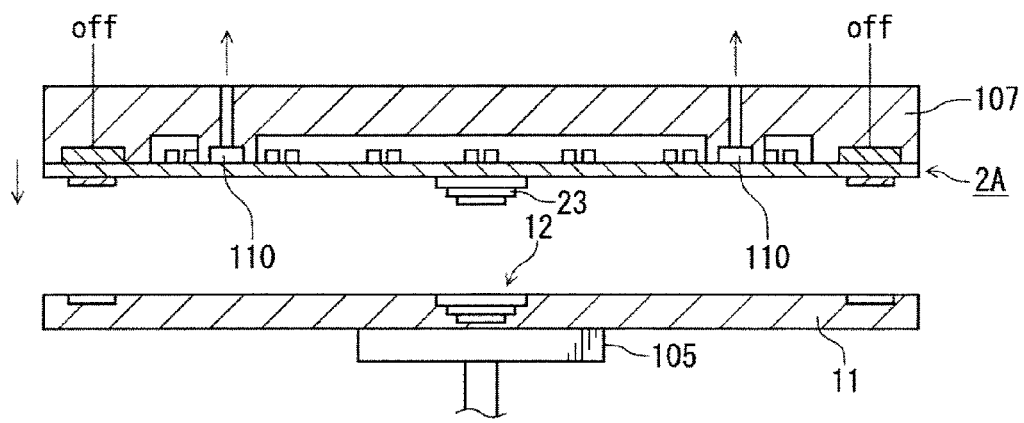
FIG. 31 is a process chart illustrating the process of combining the upper wafer and the lower wafer by the attaching/detaching module.
Figure 32:
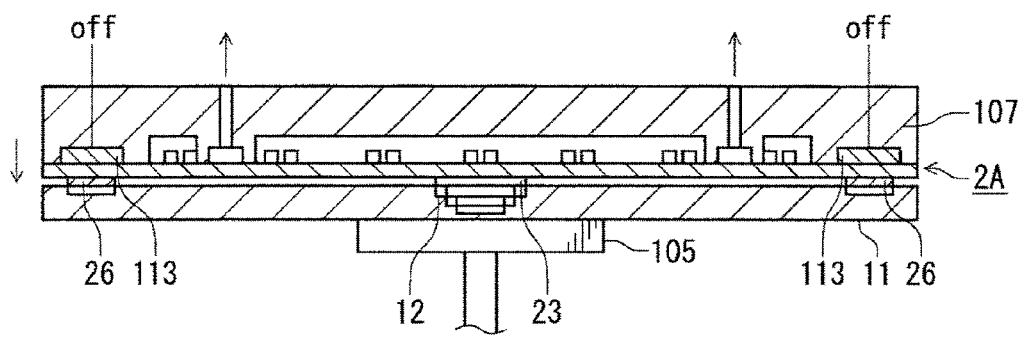
FIG. 32 is a process chart illustrating the process of combining the upper wafer and the lower wafer by the attaching/detaching module.
Figure 33:
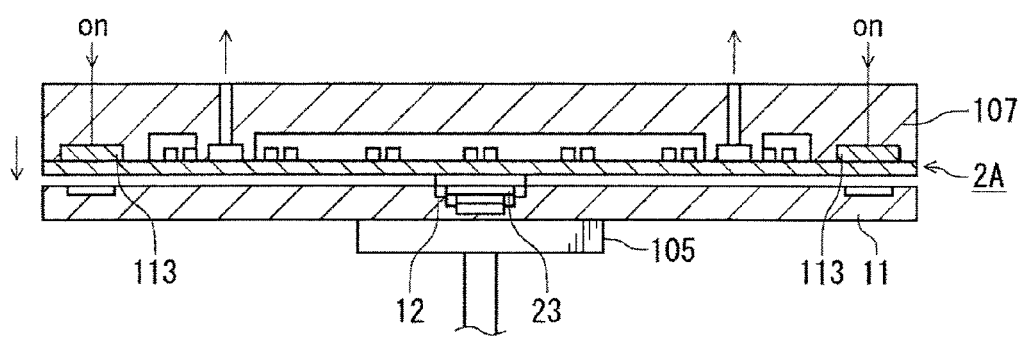
FIG. 33 is a process chart illustrating the process of combining the upper wafer and the lower wafer by the attaching/detaching module.
Figure 34:
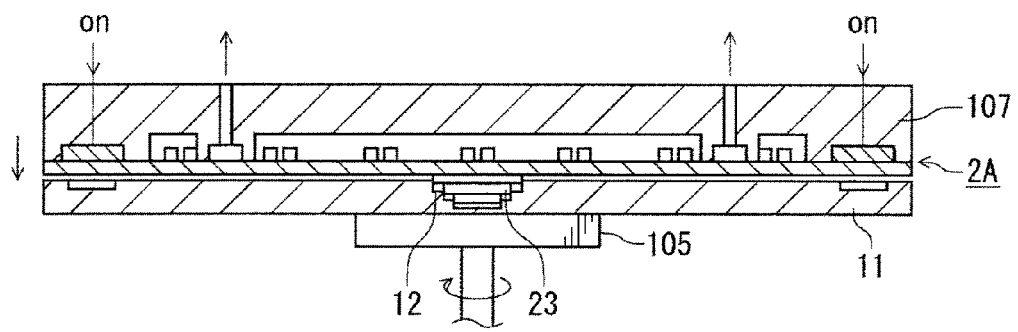
FIG. 34 is a process chart illustrating the process of combining the upper wafer and the lower wafer by the attaching/detaching module.
Figure 35:
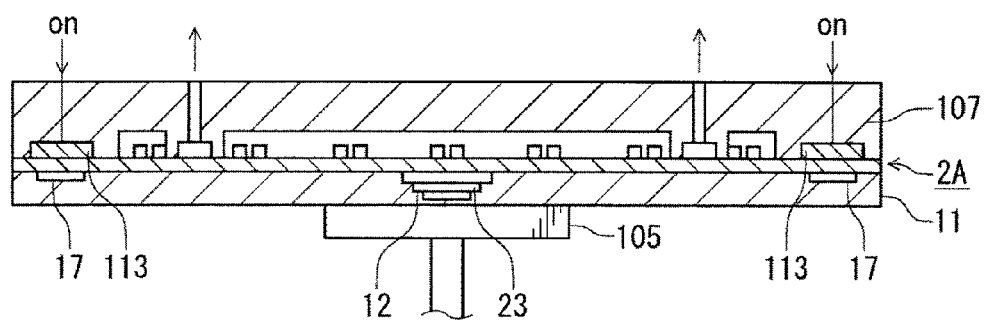
FIG. 35 is a process chart illustrating the process of combining the upper wafer and the lower wafer by the attaching/detaching module.

Subsequently, the transfer mechanism 62 retracts from the attaching/detaching module 101, and the holding part main body 107 is lowered (FIG. 31). The projection 23 of the upper wafer 2A is inserted into the recess 12 of the lower wafer 11 (FIG. 32), and power is fed from the electric power supply part 114 to the electromagnets 113 whose magnetic force raises the stoppers 26 of the upper wafer 2A (FIG. 33). The lower wafer 11 is rotated by the spin chuck 105 and the holding part main body 107 is further lowered, whereby the projection 23 is screwed with and into the recess 12 (FIG. 34). When the spin chuck 105 is rotated by a predetermined amount, the front surface of the lower wafer 11 comes into contact with the rear surface of the upper wafer 2A, and the electrodes 24 of the upper wafer 2A are connected to the electrodes 13 of the lower wafer 11, the rotation is stopped (FIG. 35).

Figure 36:
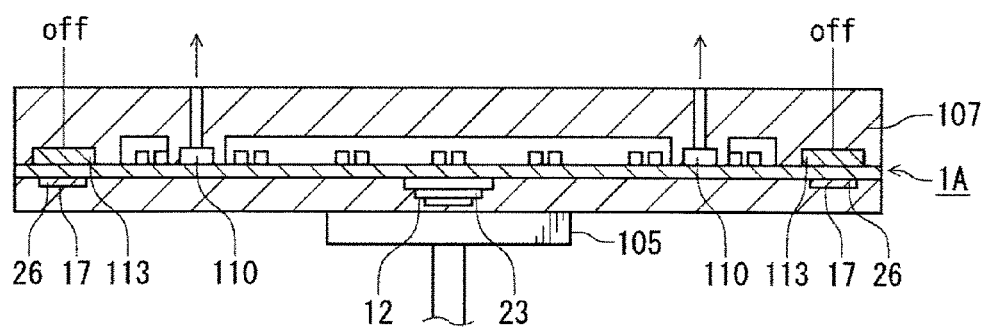
FIG. 36 is a process chart illustrating the process of combining the upper wafer and the lower wafer by the attaching/detaching module.

By the connection between the electrodes, power is fed from the power supply part 16 of the lower wafer 11 to the sensor pairs 31, and the measurement data of the sensor pairs 31 is outputted from the ratio communication parts 46 of the lower wafer 11. In this event, the engaging recesses 17 of the lower wafer 11 are located to be superposed on the stoppers 26. The electric power supply to the electromagnets 113 is turned off and the stoppers 26 are inserted into and engaged with the engaging recesses 17, whereby the measuring wafer 1A is formed (FIG. 36).

Figure 37:
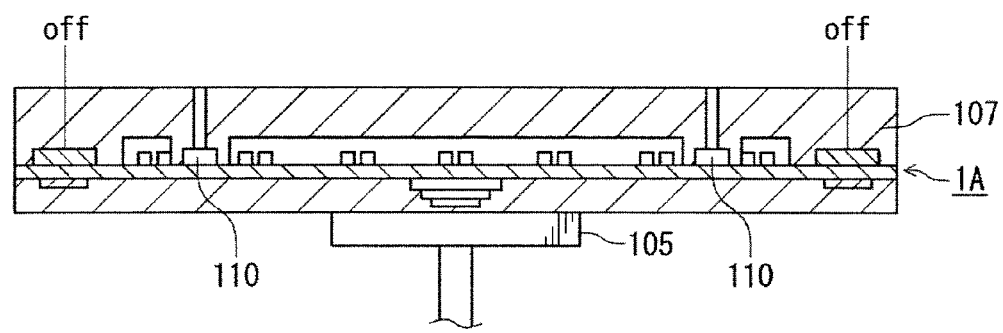
FIG. 37 is a process chart illustrating the process of combining the upper wafer and the lower wafer by the attaching/detaching module.
Figure 38:
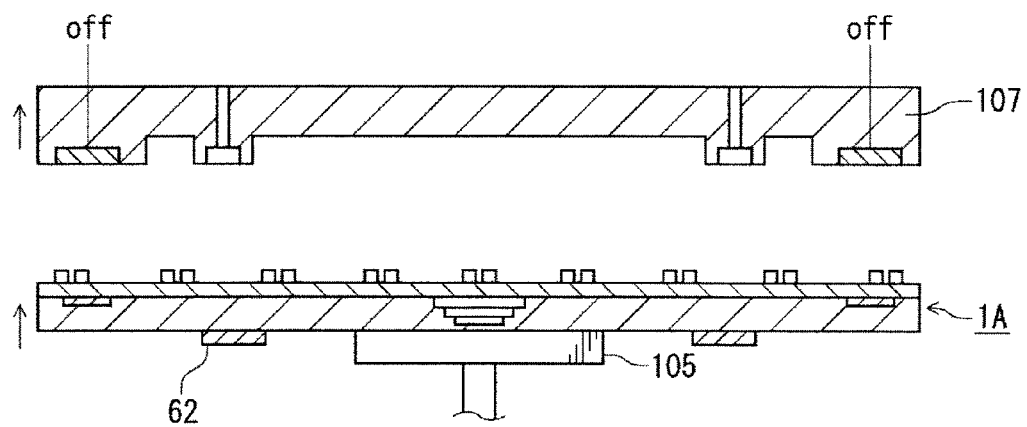
FIG. 38 is a process chart illustrating the process of combining the upper wafer and the lower wafer by the attaching/detaching module.

Then, the suction through the suction ports 110 is stopped, the fixation of the measuring wafer 1A by the holding part main body 107 is released (FIG. 37), and the holding part main body 107 is raised. Then, the transfer mechanism 62 enters the attaching/detaching module 101 and is located at the rear surface of the measuring wafer 1A (FIG. 38), lifts up the measuring wafer 1A against the suction by the spin chuck 105, whereby the measuring wafer 1A is delivered to the transfer mechanism 62. Thereafter, the measuring wafer 1A is delivered in the order of the delivery module TRS0 in the tower T1, the delivery arm 63, the delivery module TRS3, the carrier arm A3, and the edge exposure module 87. In the edge exposure module 87, the measuring wafer 1A is mounted on the stage, and the notch N of the measuring wafer 1A is detected. Then, the stage is rotated to direct the notch N to a predetermined orientation, and then the carrier arm A3 receives the measuring wafer 1A again and carries the measuring wafer 1A to the heating module 86 for which the measuring wafer 1A is set to perform measurement.

Figure 39:
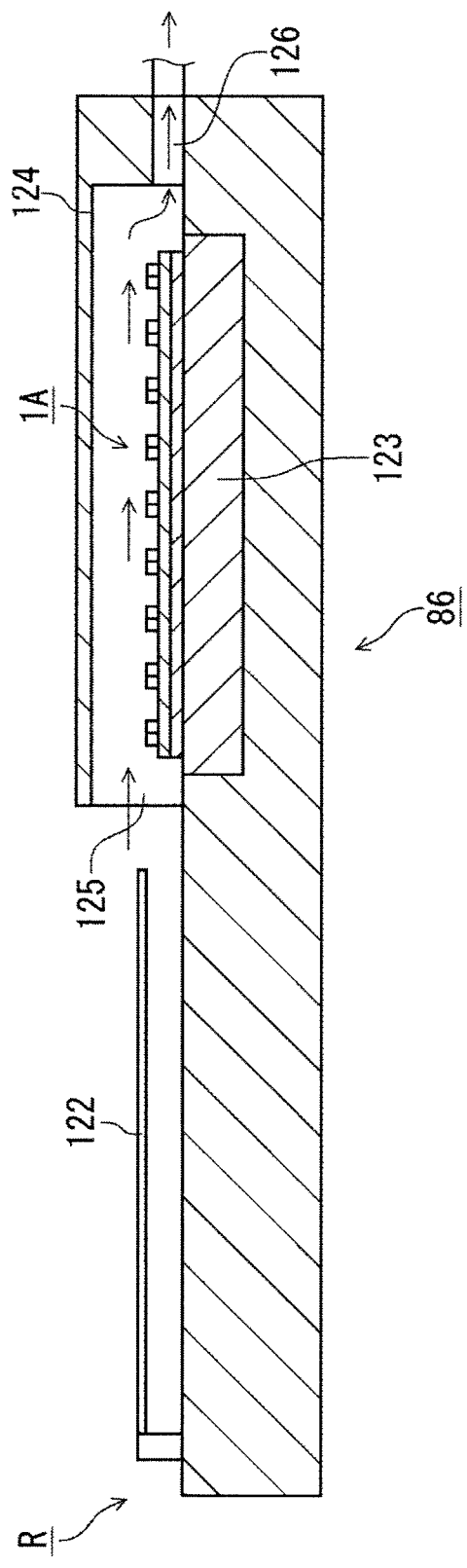
FIG. 39 is a longitudinal sectional view of a heating module.

When the measuring wafer 1A is carried, a carry-in signal is transmitted from the heating module 86, and the control unit 7 received the carry-in signal starts to store data on the voltages Vx, Vy transmitted from each channel, into the memory 74. FIG. 39 is a side view of the heating module 86. The measuring wafer 1A delivered from the carry region R to a horizontally movable cooling plate 122 is mounted on the hot plate 123 by not-illustrated raising and lowering pins provided on the hot plate 123.

Since the orientation of the measuring wafer 1A has been adjusted as described above, each channel is placed in a predetermined orientation on the hot plate 123. The measuring wafer 1A is exposed to gas flow flowing from an opening portion 125 opened on the carry region R side of a cover 124 covering the hot plate 123 toward an exhaust port 126 provided distanced from the carry region R, and Vx, Vy are continuously acquired. Arrows in the drawing indicate the direction of the gas flow. After a lapse of a predetermined time from the transmission of the carry-in signal, the measuring wafer 1A is delivered from the top of the hot plate 123 to the carry arm A3 via the raising and lowering pins and the cooling plate 122, and carried out of the heating module 86 by the carrier arm A3. A carry-out signal is outputted from the heating module 86, and the control unit 7 received the signal stops the acquisition of Vx, Vy.

Figure 40:
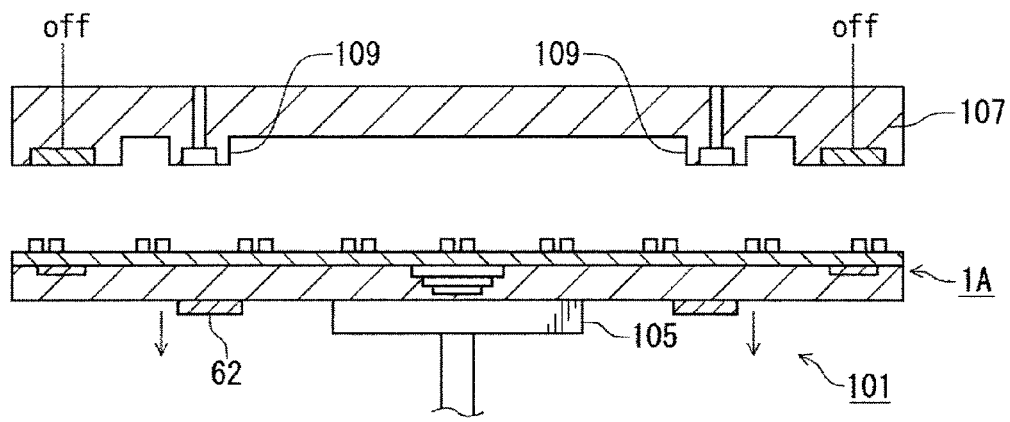
FIG. 40 is a process chart illustrating a process of separating the upper wafer and the lower wafer by the attaching/detaching module.

For example, the measuring wafer 1A is carried to the edge exposure module 87, the notch N thereof is detected by the optical sensor and the stage, and the orientation of the measuring wafer 1A is adjusted so that the notch N faces in a predetermined direction. After the adjustment of the orientation, the measuring wafer 1A is carried in the order of, for example, the carrier arm A3, the delivery module TRS3 in the tower T1, the delivery arm 63, the delivery module TRS0 in the tower T1, and the transfer mechanism 62, and then carried by the transfer mechanism 62 to the attaching/detaching module 101 and held on the spin chuck 105 (FIG. 40).

Figure 41:
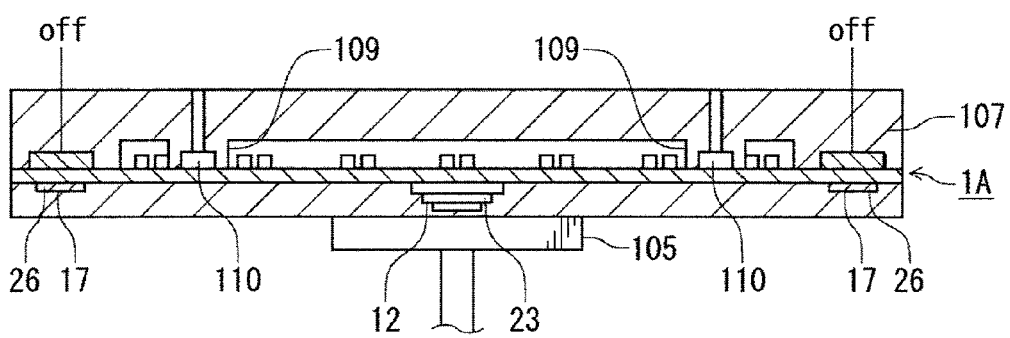
FIG. 41 is a process chart illustrating the process of separating the upper wafer and the lower wafer by the attaching/detaching module.
Figure 42:
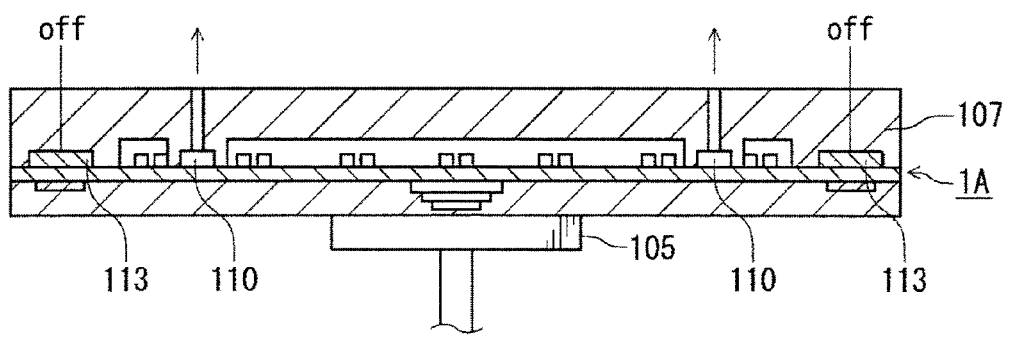
FIG. 42 is a process chart illustrating the process of separating the upper wafer and the lower wafer by the attaching/detaching module.
Figure 43:
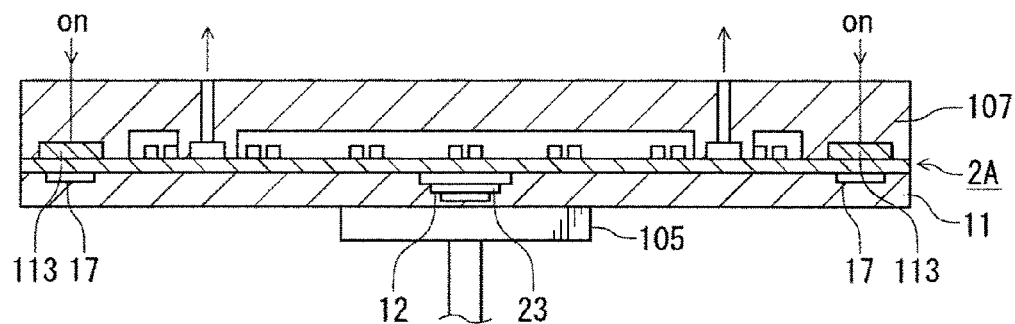
FIG. 43 is a process chart illustrating the process of separating the upper wafer and the lower wafer by the attaching/detaching module.
Figure 44:
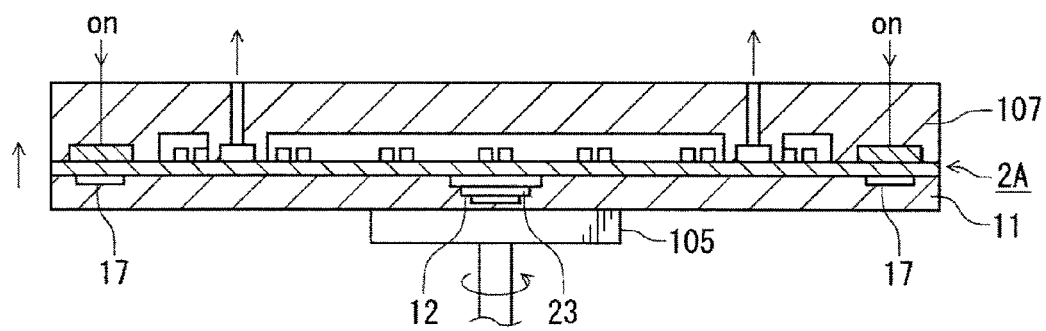
FIG. 44 is a process chart illustrating the process of separating the upper wafer and the lower wafer in the attaching/detaching module.
Figure 45:
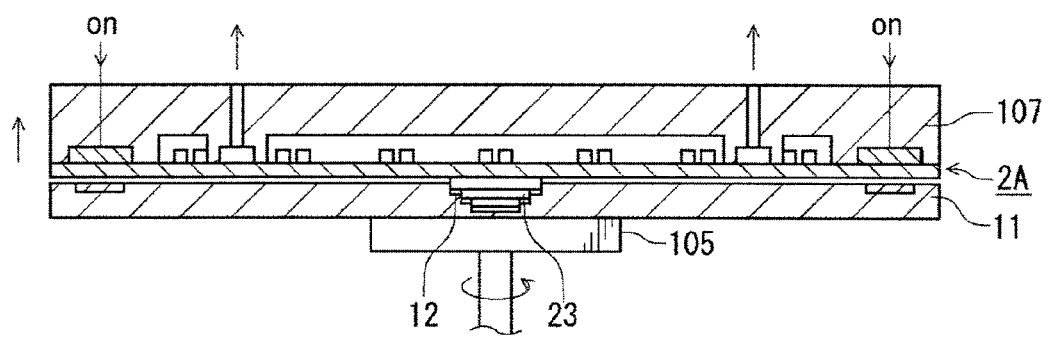
FIG. 45 is a process chart illustrating the process of separating the upper wafer and the lower wafer by the attaching/detaching module.

After the transfer mechanism 62 retracts from the attaching/detaching module 101, the holding part main body 107 is lowered. When the projecting portions 109 of the holding part main body 107 come into contact with the front surface of the measuring wafer 1A (FIG. 41), suction through the suction ports 110 is performed, whereby the measuring wafer 1A is held on the holding part main body 107 (FIG. 42). Thereafter, when power is fed to the electromagnets 113, the stoppers 26 are raised from the engaging recesses 17, and the engagement between them is released (FIG. 43), the spin chuck 105 starts to rotate and the holding part main body 107 starts to rise (FIG. 44). Thus, the projection 23 of the upper wafer 2A gets away from the recess 12 of the lower wafer 11 (FIG. 45), the connection between the electrodes 24 of the upper wafer 2A and the electrodes 13 of the lower wafer 11 is released, and the power feeding to the sensor pairs 31 and the transmission of data from the sensor pairs 31 are stopped.

Figure 46:
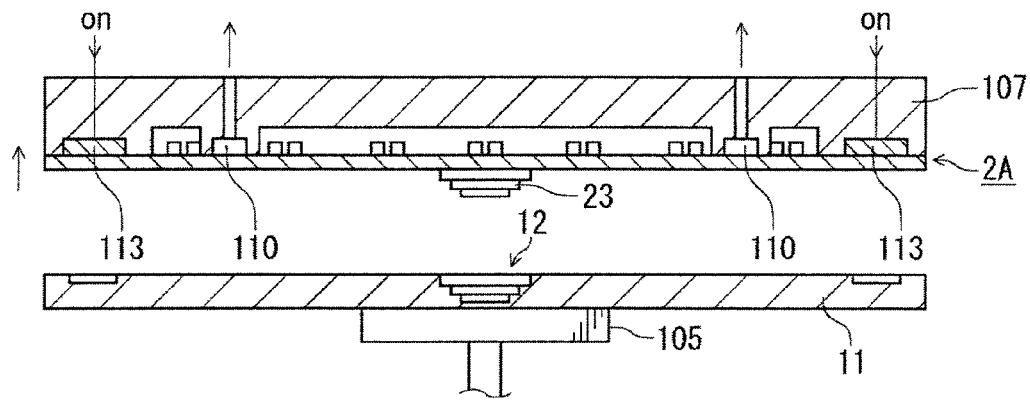
FIG. 46 is a process chart illustrating the process of separating the upper wafer and the lower wafer by the attaching/detaching module.
Figure 47:
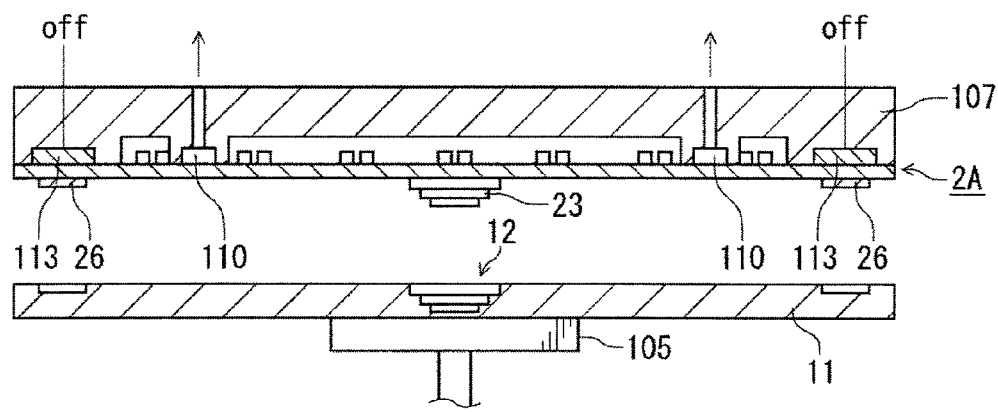
FIG. 47 is a process chart illustrating the process of separating the upper wafer and the lower wafer by the attaching/detaching module.

When the spin chuck 105 is rotated by a predetermined amount to release the screwing between the projection 23 and the recess 12, the rotation of the spin chuck 105 is stopped (FIG. 46). On the other hand, when the holding part main body 107 continuously rises by a predetermined amount, the rise is stopped and the power feeding to the electromagnets 113 is turned off, and the stoppers 26 project to the lower surface of the upper wafer 2A (FIG. 47).

Figure 48:
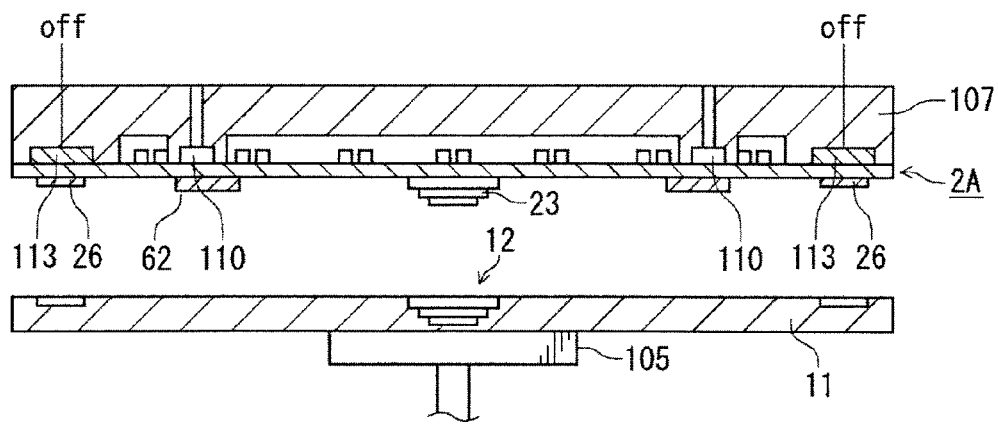
FIG. 48 is a process chart illustrating the process of separating the upper wafer and the lower wafer by the attaching/detaching module.

Thereafter, when the transfer mechanism 62 entered the attaching/detaching module 101 comes around to the rear surface of the upper wafer 2A, the suction through the suction ports 110 is stopped, and the upper wafer 2A is delivered to the transfer mechanism 62 (FIG. 48). The transfer mechanism 62 carries the upper wafer 2A to the storage module 91. By the adjustment of the orientation of the measuring wafer 1A by the edge exposure module 87 after measurement as described above and the control of the rotation amount of the spin chuck 105 when detaching the upper wafer 2A from the lower wafer 11 to a predetermined amount, the upper wafer 2A is returned, in a predetermined orientation, to the storage module 91. This prevents the sensor pairs 31 from interfering with the holding part main body 107 when the upper wafer 2A is carried to the attaching/detaching module 101 next time. Subsequently, the lower wafer 11 is delivered to the transfer mechanism 62, carried to the storage module 91, and supported on the support parts 93 in a predetermined orientation as with the upper wafer 2A. In this event, the pin 95 comes into contact with the electrode 18 on the rear surface of the lower wafer 11 to charge the power supply part 16 as illustrated in FIG. 21.

Subsequent to the measurement of gas flow, an example in the case of performing measurement of the rotation center for the resist coating module 81 will be described. As in the case of measuring the gas flow, the user designates the measurement kind, a module for which measurement is to be performed, and a carry path for the measuring wafer 1B. The transfer mechanism 62 carries the upper wafer 2B, similarly to the upper wafer 2A, to the attaching/detaching module 101, and then similarly carries the lower wafer 11 to the attaching/detaching module. Incidentally, the lower wafer 11 carried as described above is the lower wafer 11 which has been waiting in the storage module 91 during the last gas flow measurement among the two lower wafers 11 stored in the storage module 91.

Thereafter, the upper wafer 2B and the lower wafer 11 are connected to each other as with the measuring wafer 1A to form the measuring wafer 1B, which is carried to the resist coating module 81 for which the measuring wafer 1B is set to perform measurement. The measuring wafer 1B is delivered by the carrier arm A3 to the spin chuck 82, and the rotation of the spin chuck 82 is started and acquisition of data on the acceleration is started by the control unit 7.

After a lapse of a predetermined time from the acquisition of the data, the acquisition of the data is stopped and the rotation of the spin chuck 82 is stopped by the control unit 7. The process of the start of rotation and the start of data acquisition and then the stop of rotation and the stop of data acquisition is repeated, and the position of the measuring wafer 1B on the spin chuck 82 is displaced every time the rotation is stopped. After the data acquisition is performed three times as described above, the measuring wafer 1B is carried to the attaching/detaching module 101 and separated into the upper wafer 2B and the lower wafer 11, and then returned to the storage module 91, as with the measuring wafer 1A.

The details of the procedure of the height position detection by the measuring wafer 1B are omitted. Briefly explaining the procedure, when the measuring wafer 1B is carried to a module for which the measuring wafer 1B performs measurement, the control unit 7 starts to store data on the acceleration as in the case of detecting the rotation center position. As described in the example of delivering to the raising and lowering pins in FIG. 16, FIG. 17, the carrier mechanism moves to above the delivery position for the wafer W in the set module, and is then lowered. During this time, the data on the acceleration is continuously stored, and when the carrier mechanism is lowered by a predetermined amount, the lowering and the data acquisition are stopped.

Figure 49:
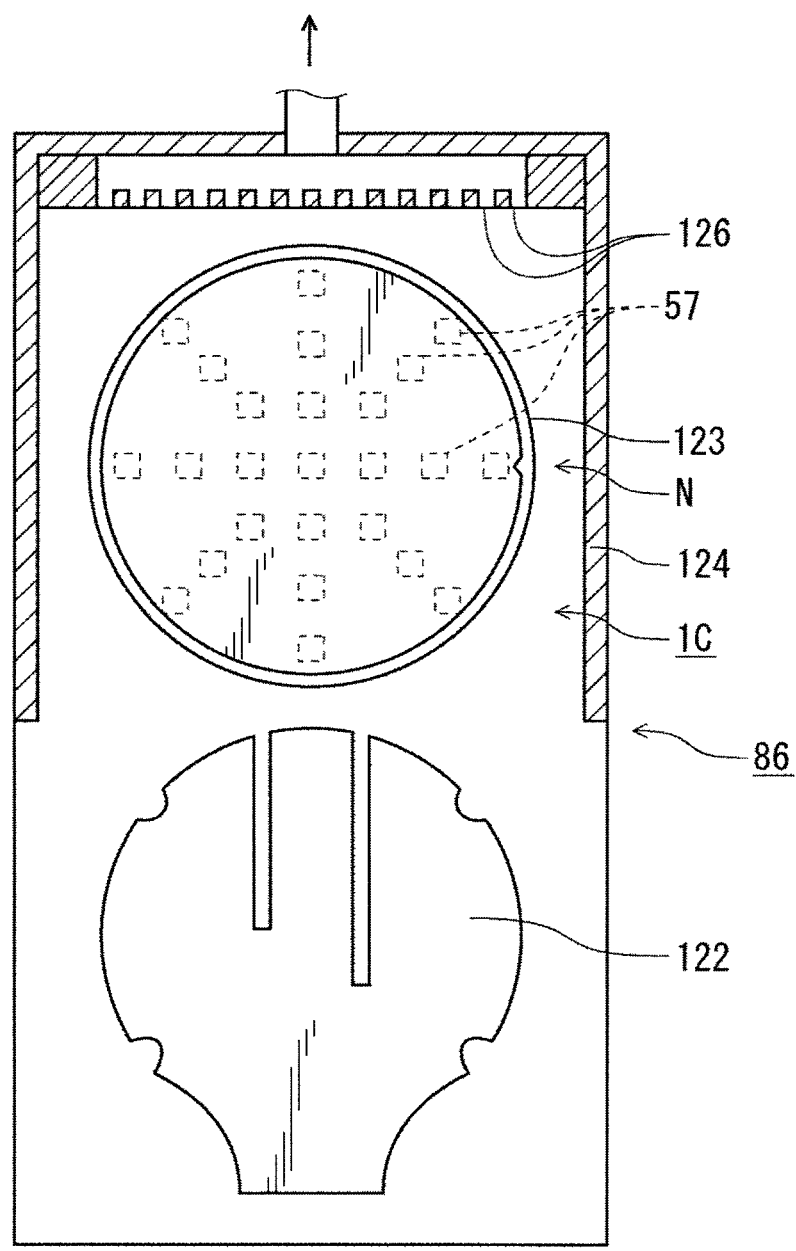
FIG. 49 is a plan view of a heating module.

About the temperature detection by the measuring wafer 1C, its measurement procedure will be briefly described. After the measuring wafer 1C is composed of the upper wafer 2C and the lower wafer 11 in the attaching/detaching module 101, for example, as with the measuring wafer 1A, the orientation is adjusted in the edge exposure module 87 so that the measuring wafer 1C is located at a predetermined position in the heating module 86 for which the temperature sensors 57 of the channels perform measurement. Then, the measuring wafer 1C is carried to the hot plate 123 of the heating module 86 and performs measurement as illustrated in FIG. 49, and is then separated in the attaching/detaching module 101 and returned to the storage module 91. Also in the case of performing the measurement, the lower wafer 11 different from the lower wafer 11 which has been used for the last measurement is used. The lower wafers 11 are alternately used as described above to keep a state that electric power required for measurement is accumulated in the power supply part 16 of the lower wafer 11 used for measurement.

The user can display measurement results about the modules for which measurements have been performed and data is stored in the control unit 7, on the display part as has been described. Further, about the module for which the detection of the rotation center position has been performed, the delivery by the carrier arm A3 is controlled so that the center of the wafer W is located at the specified rotation center position when the treatment mode is executed next time after the measurement. About the module for which the measurement of the height position has been performed, for example, the user adjusts, according to the measurement result, the height position of a member for receiving the wafer W from the carrier mechanism for the wafer W such as the raising and lowering pins 83. This prevents occurrence of a state that the lowering amount of the carrier mechanism with respect to the receiving member is insufficient when delivering the wafer W to fail to deliver the wafer W to the receiving member.

Further, about the module for which the gas flow measurement has been performed, the position of the air supply port and the position of the exhaust port are adjusted to form gas flow highly uniform at portions on the front surface of the wafer W. About the heating module 86 for which the temperature measurement has been performed, adjustment is performed to increase uniformity in heating temperature on the front surface of the wafer W by adjusting the outputs of heaters at portions of the hot plate 123. After the adjustments are performed, the treatment mode is executed to carry and treat the wafer W.

Though the case of performing measurement in one module is described in the above example, data can be continuously acquired in a plurality of modules when performing various kinds of measurements. For example, in the case of performing the measurement of gas flow, the measuring wafer 1A can be set to perform measurement for the resist coating module 81 after the measurement of the heating module 86. With this setting, the measuring wafer 1A is carried in the order of the heating module 86, the carrier arm A3, and the resist coating module 81, and then returned to the attaching/detaching module 101 after acquiring data in the modules.

The measuring wafer 1A to 1C is composed of the lower wafer 11 in common use for the measuring wafers 1A to 1C and the upper wafer 2A to 2C configured to be detachably attached to the lower wafer 11. Further, the lower wafer 11 is provided with the ADC 45 which digitally converts the outputs from the sensors provided on the upper wafer 2A to 2C, the wireless transmission parts 46 which transmit the converted data by wireless, and the power supply part 16 which supplies electric power to the ADC 45, the wireless transmission parts 46, and the sensors. Therefore, the number of components can be suppressed as compared to the case of creating a measuring wafer for each of the measurement kinds, and thereby reduce the cost required for measurement. Further, since the measurement data is transmitted by wireless in the measuring wafer 1A to 1C, the measuring wafer 1A to 1C can be carried among the plurality of modules to continuously acquire data as described above as compared to the case of transmitting data between the measuring wafer 1A to 1C and the control unit 7 by wire. This saves the user from the trouble of carrying the measuring wafer for each module to increase the measurement efficiency.

Further, since the storage module 91 which stores the upper wafers 2A to 2C and the lower wafers 11 is provided and the attachment/detachment of the upper wafer 2A to 2C to/from the lower wafer 11 is automatically performed using the transfer mechanism 62 for the wafer W and the attaching/detaching module 101 in the coating and developing apparatus 6, the measurement can be efficiently performed. Incidentally, the attachment/detachment may be manually performed by the user. For example, the measuring wafer 1A to 1C may be formed by attaching the upper wafer 2A to 2C to the lower wafer 11 outside the coating and developing apparatus 6, and then stored in the carrier C and carried to the coating and developing apparatus 6 as with the wafer W.

Further, in the measuring wafer 1A, the circuit components 15 for performing measurement by wireless and the power supply part 16 are formed on the lower wafer 11, Accordingly, the gas flow around the sensor pairs 31 is never disturbed by the circuit components 15 and the power supply part 16, so that the wind direction and the wind speed can be highly accurately measured. Note that for the circuit components 15, dedicated components such as IC chips may be used to suppress the height of the components, thereby suppressing the thickness of the measuring wafers 1A to 1C. Incidentally, since the gas flow is barely affected by the thickness of the measuring wafer 1A in a module, such as the resist coating module 81, in which gas is supplied from above the wafer W and exhausted by the cup 85 and therefore flows toward the peripheral portion of the wafer W, the highly accurate measurement data can be acquired even if the thickness is relatively large. In addition, there is an advantage of suppressing the manufacturing cost of the lower wafer 11 since there is no need to manufacture the dedicated components. Further, the control unit 7 may calculate not the wind direction and the wind speed but only the wind direction and display it on the display part 75. Further, the measuring wafer 1A may be mounted not in the module but on the carrier mechanism and measure the wind direction and the wind speed of the carry path for the wafer W.

The upper wafers 2A to 2C and the lower wafers 11 are stored and kept waiting in the same storage module 91 in the above example, but may be stored in storages modules provided at different locations. The installation locations of the storage module 91 and the attaching/detaching module 101 are not limited to the tower T1. They may be provided inside the towers T2 to T4 on the interface side. Further, the lower wafer holding part 103 and the upper wafer holding part 104 of the attaching/detaching module 101 may be provided in the carrier C and attachment/detachment may be performed in the carrier C. Further, the carrier C storing the upper wafers 2A to 2C and the lower wafers 11 in a separation state may be carried to the coating and developing apparatus 6, and attachment/detachment may be performed in the attaching/detaching module 101 in the coating and developing apparatus 6.

Further, since the orientations of the upper wafers 2A to 2C and the lower wafers 11 are set in predetermined orientations in the storage module 91 and the attaching/detaching module 101, the measuring wafer 1A to 1C is carried in the predetermined orientation for each module. In other words, by grasping the orientation of the measuring wafer 1A to 1C when it is carried into each module, the measurement position of the sensor of each channel can be recognized. Accordingly, it is not always necessary to adjust the orientation of the measuring wafer 1A, 1C by the edge exposure module 87 before the measurement of the gas flow and temperature. The carry order of the upper wafer 2A to 2C and the lower wafer 11 between the storage module 91 and the attaching/detaching module 101 is not limited to that in the above example, but either the upper wafer 2A to 2C or the lower wafer 11 may be carried first to a module as a carry destination.

(Second Embodiment)

Figure 50:
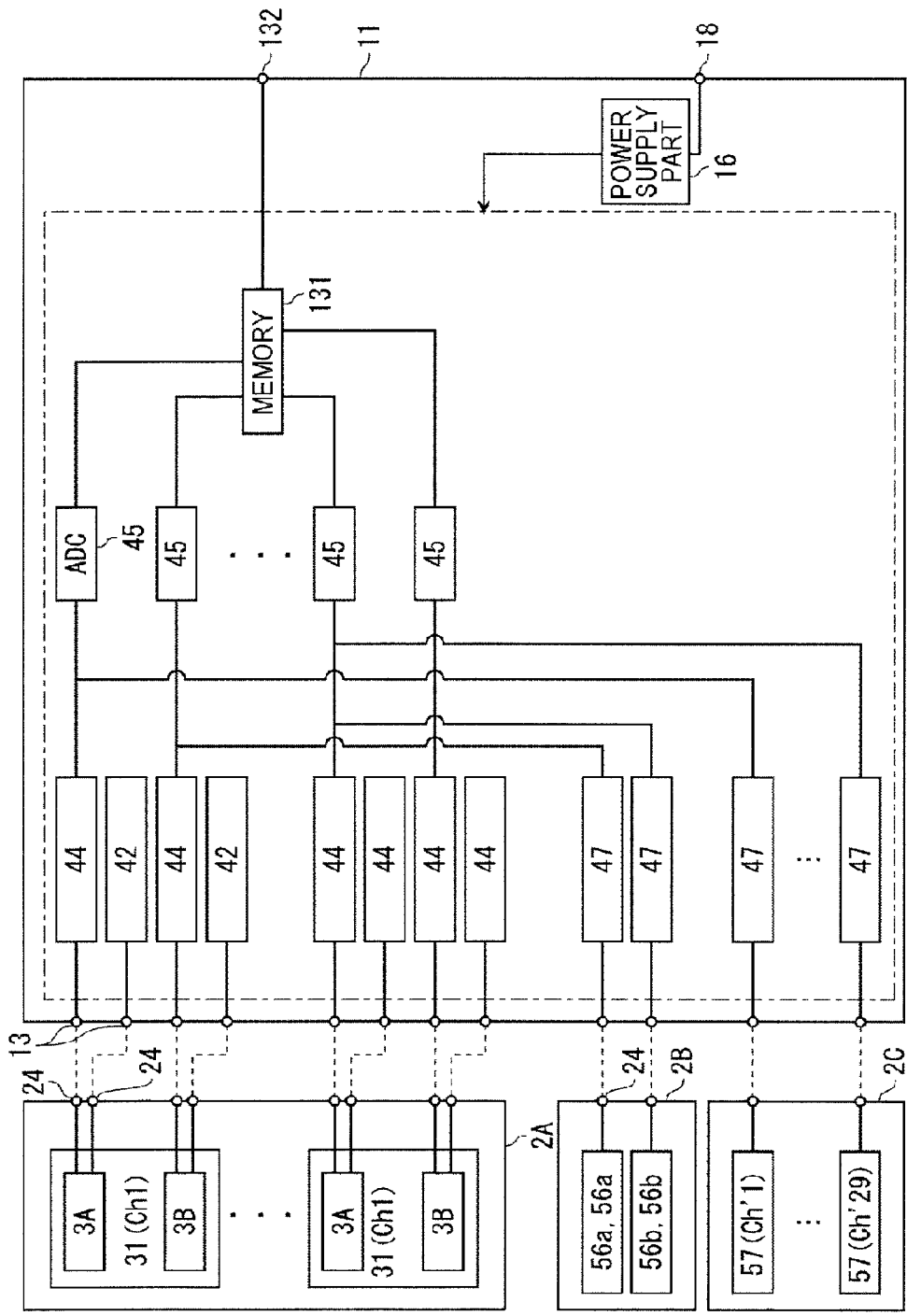
FIG. 50 is a schematic diagram of another measuring wafer.
Figure 51:
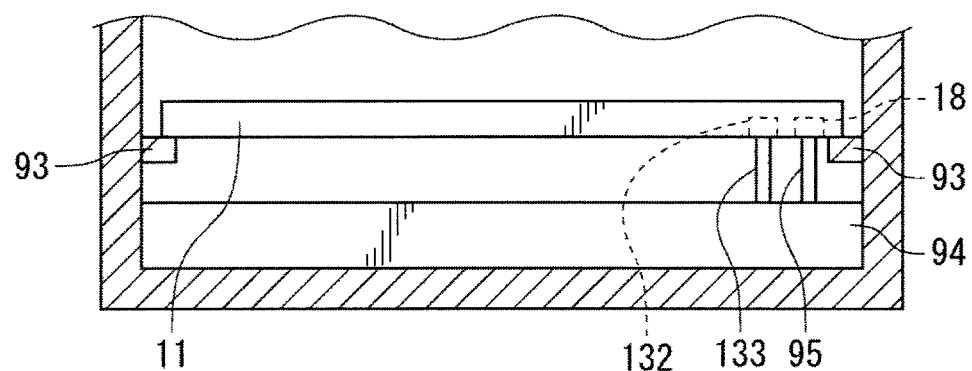
FIG. 51 is a partially sectional view of a storage module storing a measuring wafer.

Instead of providing the wireless transmission parts 46, a memory 131 may be provided as illustrated in FIG. 50 to store digitally converted measurement data. On the lower wafer 11, a data communication terminal 132 connected to the memory 131 is provided. As illustrated in, for example, FIG. 51, a pin 133 for data transmission is provided in the storage module 91, and comes into contact with the terminal 132 when the lower wafer 11 is stored in the storage module. Then, the measurement data in the memory 131 may be transmitted via the pin 133 to the memory 74 of the control unit 7. The memory 131 may be provided for backup also in the first embodiment. Though the ADC 45 and the wireless transmission part 46 are in common use for the component group 44 and the circuit part 47 in each embodiment, the ADC 45 and the wireless transmission part 46 may be individually provided for the component group 44 and the circuit part 47. Further, the ADC 45 may be individually provided at a stage subsequent to the component group 44 and the circuit part 47, and the wireless transmission part 46 may be in common use.

Figure 52:
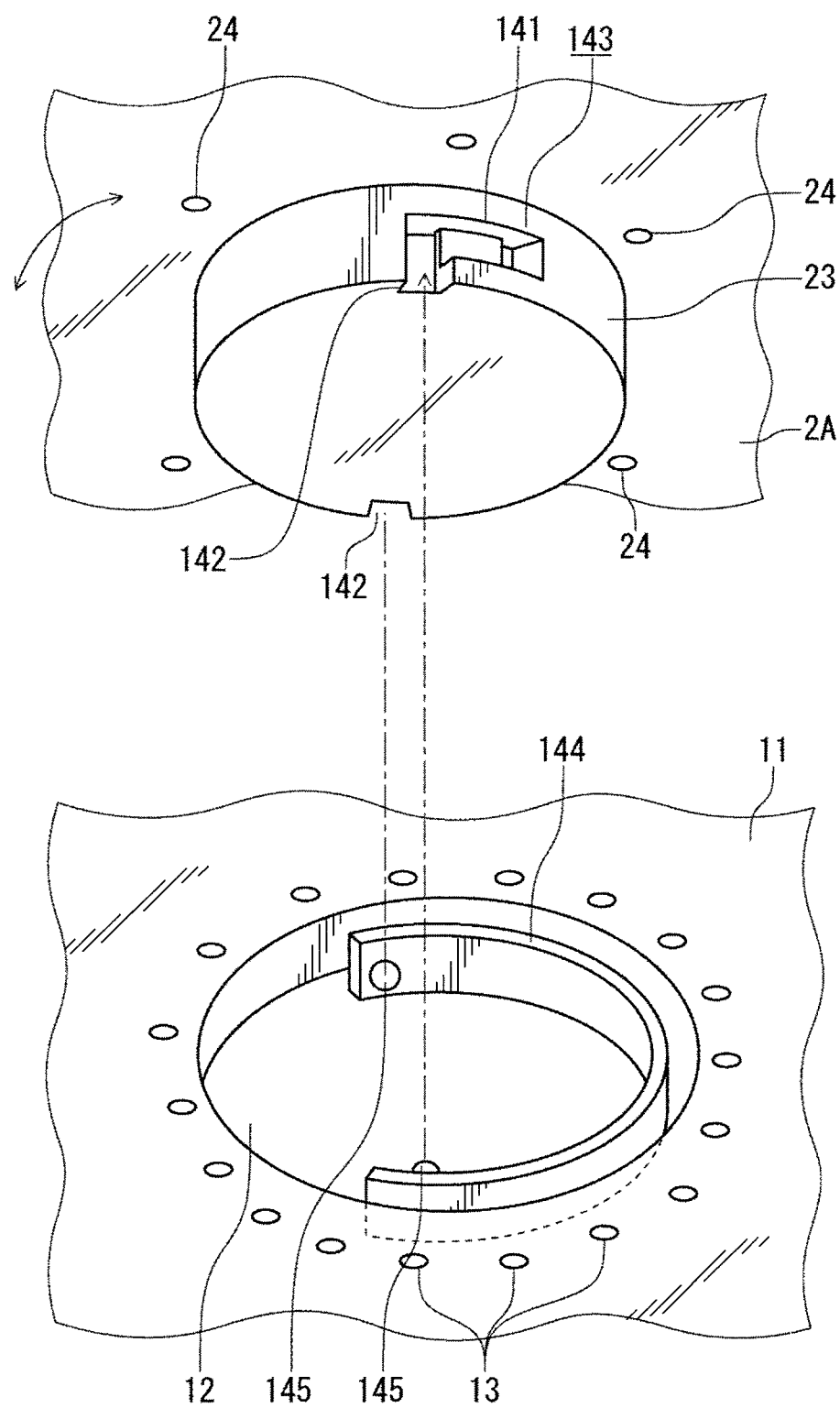
FIG. 52 is a perspective view of another attaching/detaching mechanism for the measuring wafer.

The attaching/detaching mechanism for the upper wafer 2A to 2C and the lower wafer 11 in the above example is not limited to the above-described projection 23, thread of the recess 12, and stoppers 26. FIG. 52 illustrates other configurations of middle portions of the upper wafer 2A and the lower wafer 11. The projection 23 at the middle of the upper wafer 2A is formed in a circular shape, and has grooves 141 formed in the circumferential surface which extend upward from the lower end of the projection 23 and are then bent to extend in the peripheral direction of the projection 23. In the groove 141, a portion extending upward forms an insertion slot 142 for a later-described projection 145, an end portion in the extending direction forms a fixing recess 143 for the projection 145, and those portions are larger in depth than the other portion. The recess 12 of the lower wafer 11 is provided with a fixation member 144 being a spring in an arc shape in a plan view in which the projections 145 are formed.

For attaching the upper wafer 2A to the lower wafer 11 by the attaching/detaching module 101, the projection 23 enters the inside of the fixation member 144 and the projections 145 are inserted into the insertion slots 142. Thereafter, the upper wafer 2A is rotated by the attaching/detaching module 101, and the projections 145 are moved in the grooves 141 and fell into the fixing recesses 143. The fixation member 144 being a spring urges the projections 145 toward the fixing recesses 143, and thereby fixes the lower wafer 11 and the upper wafer 2A. When detaching the upper wafer 2A, the upper wafer 2A is inversely rotated, the projections 145 rise on shallow portions of the grooves 141 from the fixing recesses 143 and move to the insertion slots 142, and then the lower wafer 11 and the upper wafer 2A are separated from each other.

Figure 53:
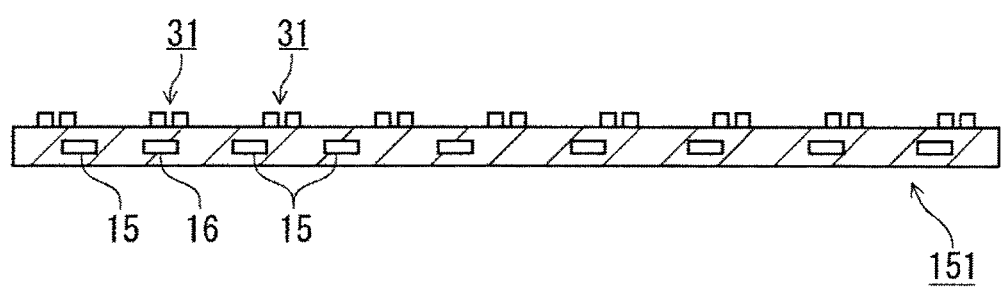
FIG. 53 is a longitudinal sectional view illustrating another wafer for gas flow measurement.

Incidentally, it becomes necessary to prevent the gas flow around the sensor pairs 31 from being affected by the circuit components 15 and the power supply part 16 in order to highly accurately measure the wind direction and the wind speed in the measuring wafer 1A. FIG. 53 illustrates a measuring wafer 151 configured such that it is not divided into an upper wafer and a lower wafer but the circuit components 15 and the power supply part 16 are buried in one wafer. Since the measuring wafer 151 has the same configuration as that of the measuring wafer 1A except that the measuring wafer 151 is not divided, highly accurate measurement can be performed even by using the measuring wafer 151.

Preferred embodiments of the present invention have been described above with reference to the accompanying drawings, but the present invention is not limited to the embodiments. It should be understood that various changes and modifications are readily apparent to those skilled in the art within the scope of the technical spirit as set forth in claims, and those should also be covered by the technical scope of the present invention.

What is claimed is:

1. A measuring substrate used for a substrate treatment apparatus in which a treatment target substrate is carried by a substrate carrier mechanism into a treatment module and treated, and for performing measurement of a factor affecting a treatment state of the treatment target substrate or a factor relating to a carry operation for the substrate, the measuring substrate comprising:
   a first substrate having a sensor part for measuring at least either of the factors; and
   a second substrate that is to be detachably stacked on a lower side of the first substrate,
   the second substrate comprising:
     a signal processing part that processes a measurement signal obtained by measurement by the sensor part;
     a power supply part for feeding power to the sensor part; and
     at least either a memory that stores measurement data obtained by being processed in the signal processing part or a communication part for transmitting the measurement data by wireless,
   wherein the second substrate is in common use for a plurality of kinds of first substrates different in measured factor measured by the sensor part from each other,
   wherein one of an engaging part and an engaged part engaging with each other is provided at a central portion of a rear surface of the first substrate, and another of the engaging part and the engaged part is provided at a central portion of a front surface of the second substrate, wherein threaded portions screwed into each other are formed at center portions of the first substrate and the second substrate, wherein the first substrate includes an opening portion formed in a lower surface of a substrate main body, and an engaging projection that is provided on a lower side of the opening portion to freely project and retract and projects to a lower side in a state that the engaging projection is locked to an upper surface of the opening portion, and wherein the second substrate includes an engaging recess that engages with the engaging projection.

2. The measuring substrate as set forth in claim 1, wherein the sensor part provided on the first substrate of one of the plurality of kinds is a sensor part for measuring a wind direction.

3. A substrate treatment apparatus in which a treatment target substrate is carried by a substrate carrier mechanism into a treatment module and treated, the substrate treatment apparatus comprising:

a storage part that stores a plurality of kinds of first substrates that have sensor parts for measuring a factor affecting a treatment state of the treatment target substrate or a factor relating to a carry operation for the substrate and are different in measured factor measured by the sensor part from each other, and a second substrate that is to be detachably stacked on a lower side of the first substrate and in common use for the plurality of kinds of first substrates; and an attaching/detaching mechanism for attaching/detaching the first substrate to/from the second substrate, the attaching/detaching mechanism includes one of an engaging part and an engaged part engaging with each other provided at a central portion of a rear surface of the first substrate and another of the engaging part and the engaged part provided at a central portion of a front surface of the second substrate, the second substrate comprising:
a signal processing part that processes a measurement signal obtained by measurement by the sensor part;
a power supply part for feeding power to the sensor part; and
at least either a memory that stores measurement data obtained by being processed in the signal processing part or a communication part for transmitting the measurement data by wireless, wherein threaded portions screwed into each other are formed at center portions of the first substrate and the second substrate, wherein the first substrate includes an opening portion formed in a lower surface of a substrate main body, and engaging projection that is provided on a lower side of the opening portion to freely project and retract and projects to a lower side in a state that the engaging projection is locked to an upper surface of the opening portion, and wherein the second substrate includes an engaging recess that engages with the engaging projection, wherein a measuring substrate formed by attaching the second substrate to the first substrate by the attaching/detaching mechanism is delivered to the substrate carrier mechanism.

4. A substrate treatment apparatus operation method of performing measurement using a measuring substrate before performing substrate treatment, for a substrate treatment apparatus in which a treatment target substrate is carried by a substrate carrier mechanism into a treatment module and treated, the method comprising the steps of:

forming a measuring substrate by stacking a second substrate on a lower side of a first substrate, the first substrate having a sensor part for measuring a factor affecting a treatment state of the treatment target substrate or a factor relating to a carry operation for the substrate, and the second substrate comprising:
a signal processing part that processes a measurement signal obtained by measurement by the sensor part;
a power supply part for feeding power to the sensor part; and
at least either a memory that stores measurement data obtained by being processed in the signal processing part or a communication part for transmitting the measurement data by wireless;

delivering the measuring substrate to the substrate carrier mechanism and performing measurement;

then detaching the first substrate from the second substrate, and attaching another kind of first substrate having a sensor part for measuring a measured factor different from a measured factor measured by the sensor part of the detached first substrate, to the second substrate to form a measuring substrate; and then delivering the formed measuring substrate to the substrate carrier mechanism and performing measurement, wherein one of an engaging part and an engaged part engaging with each other is provided at a central portion of a rear surface of the first substrate, and another of the engaging part and the engaged part is provided at a central portion of a front surface of the second substrate, wherein threaded portions screwed into each other are formed at center portions of the first substrate and the second substrate, wherein the first substrate includes an opening portion formed in a lower surface of a substrate main body, and an engaging projection that is provided on a lower side of the opening portion to freely project and retract and projects to a lower side in a state that the engaging projection is locked to an upper surface of the opening portion, and wherein the second substrate includes an engaging recess that engages with the engaging projection, and the step of forming the measuring substrate further comprises a step of engaging the engaging part and the engaged part with each other.

5. The measuring substrate as set forth in claim 1, wherein the one of the engaging part and the engaged part is a projection part, and the another of the engaging part and the engaged part is a recess into which the projection part is inserted.

6. The substrate treatment apparatus as set forth in claim 3,
wherein the one of the engaging part and the engaged part is a projection part, and the another of the engaging part and the engaged part is a recess into which the projection part is inserted.

7. The substrate treatment apparatus operation method as set forth in claim 4,
wherein the one of the engaging part and the engaged part is a projection part, and the another of the engaging part and the engaged part is a recess into which the projection part is inserted.

8. The measuring substrate as set forth in claim 1,
wherein the one of the engaging part and the engaged part engaging with each other is provided at a rotational center of the rear surface of the first substrate, and the another of the engaging part and the engaged part is provided at a rotational center of the front surface of the second substrate.

9. The substrate treatment apparatus as set forth in claim 3,
wherein the one of the engaging part and the engaged part engaging with each other is provided at a rotational center of the rear surface of the first substrate, and the another of the engaging part and the engaged part is provided at a rotational center of the front surface of the second substrate.

10. The substrate treatment apparatus operation method as set forth in claim 4,
wherein the one of the engaging part and the engaged part engaging with each other is provided at a rotational center of the rear surface of the first substrate, and the another of the engaging part and the engaged part is provided at a rotational center of the front surface of the second substrate.

11. The measuring substrate as set forth in claim 1, wherein
the one of the engaging part and the engaged part projects from one of the rear surface of the first substrate or the front surface of the second substrate,
the other of the engaging part and the engaged part is recessed into a recess of an other of the rear surface of the first substrate or the front surface of the second substrate, and
the one of the engaging part and the engaged part which projects is adapted to be received in its entirety within the recess of the other of the rear surface of the first substrate or the front surface of the second substrate.

12. The substrate treatment apparatus as set forth in claim 3,
the one of the engaging part and the engaged part projects from one of the rear surface of the first substrate or the front surface of the second substrate,
the other of the engaging part and the engaged part is recessed into a recess of an other of the rear surface of the first substrate or the front surface of the second substrate, and
the one of the engaging part and the engaged part which projects is adapted to be received in its entirety within the recess of the other of the rear surface of the first substrate or the front surface of the second substrate.

13. The substrate treatment apparatus operation method as set forth in claim 4,
the one of the engaging part and the engaged part projects from one of the rear surface of the first substrate or the front surface of the second substrate,
the other of the engaging part and the engaged part is recessed into a recess of an other of the rear surface of the first substrate or the front surface of the second substrate, and
the one of the engaging part and the engaged part which projects is adapted to be received in its entirety within the recess of the other of the rear surface of the first substrate or the front surface of the second substrate.

* * * * *